United States Patent
Ross et al.

(10) Patent No.: US 10,175,914 B2
(45) Date of Patent: *Jan. 8, 2019

(54) DISTRIBUTED CONTENT STORAGE AND RETRIEVAL

(71) Applicant: QUALCOMM Incorporated, San Diego, CA (US)

(72) Inventors: Robert F. Ross, San Jose, CA (US); Michael P. Lyle, Morgan Hill, CA (US)

(73) Assignee: QUALCOMM Incorporated, San Diego, CA (US)

( * ) Notice: Subject to any disclaimer, the term of this patent is extended or adjusted under 35 U.S.C. 154(b) by 627 days.

This patent is subject to a terminal disclaimer.

(21) Appl. No.: 14/019,410

(22) Filed: Sep. 5, 2013

(65) Prior Publication Data

US 2014/0059290 A1    Feb. 27, 2014

Related U.S. Application Data

(63) Continuation of application No. 12/924,205, filed on Sep. 21, 2010, now Pat. No. 8,554,993.

(60) Provisional application No. 61/277,206, filed on Sep. 21, 2009.

(51) Int. Cl.
   *G06F 3/06* (2006.01)
   *G06F 17/30* (2006.01)
   *H04L 29/08* (2006.01)

(52) U.S. Cl.
   CPC ............ *G06F 3/067* (2013.01); *G06F 3/0604* (2013.01); *G06F 3/0655* (2013.01); *G06F 17/302* (2013.01); *H04L 67/1002* (2013.01); *H04L 67/1097* (2013.01)

(58) Field of Classification Search
   CPC ...... G06F 3/0611; G06F 3/0613; G06F 3/067; G06F 3/0683; G06F 12/02
   See application file for complete search history.

(56) References Cited

U.S. PATENT DOCUMENTS

| | | | |
|---|---|---|---|
| 8,156,290 B1 * | 4/2012 | Vanninen et al. | ............ 711/154 |
| 8,554,993 B2 | 10/2013 | Ross et al. | |
| 2002/0083118 A1 | 6/2002 | Sim | |
| 2002/0124137 A1 * | 9/2002 | Ulrich et al. | ................. 711/113 |

(Continued)

FOREIGN PATENT DOCUMENTS

| CN | 101141371 A | 3/2008 |
|---|---|---|
| WO | 03023640 A2 | 3/2003 |

OTHER PUBLICATIONS

International Search Report and Written Opinion—PCT/US2010/002589—ISA/EPO—dated Nov. 23, 2010.

*Primary Examiner* — Reginald G Bragdon
*Assistant Examiner* — Thanh D Vo
(74) *Attorney, Agent, or Firm* — Muncy, Geissler, Olds & Lowe, P.C.

(57) ABSTRACT

Distributed content storage and retrieval is disclosed. A set of features associated with a content object is determined. A storage location is selected to perform an operation with respect to the content object, from a plurality of storage locations comprising a distributed content storage system, based at least in part on probability data indicating a degree to which the selected storage location is associated statistically with a feature comprising the set of features determined to be associated with the content object.

25 Claims, 20 Drawing Sheets

(56) References Cited

U.S. PATENT DOCUMENTS

| | | |
|---|---|---|
| 2005/0097286 A1* | 5/2005 | Karlsson et al. ............ 711/159 |
| 2005/0149584 A1 | 7/2005 | Bourbonnais et al. |
| 2008/0086441 A1 | 4/2008 | Wolff et al. |
| 2008/0140947 A1 | 6/2008 | Slik et al. |
| 2008/0183891 A1 | 7/2008 | Ni et al. |
| 2009/0210549 A1 | 8/2009 | Hudson et al. |

* cited by examiner

DISTRIBUTED CONTENT STORAGE AND RETRIEVAL

CROSS REFERENCE TO OTHER APPLICATIONS

This application is a continuation of co-pending U.S. patent application Ser. No. 12/924,205, entitled DISTRIBUTED CONTENT STORAGE AND RETRIEVAL filed Sep. 21, 2010 which is incorporated herein by reference for all purposes, which claims priority to U.S. Provisional Application No. 61/277,206, entitled DISTRIBUTED CONTENT STORAGE AND RETRIEVAL filed Sep. 21, 2009 which is incorporated herein by reference for all purposes.

BACKGROUND OF THE INVENTION

The design and implementation of distributed data storage systems is complicated by the problem of determining where data is and should be stored. While distributed indexing techniques already exist that map object names to storage locations, they require a substantial amount of storage. These techniques provide no assurance information will be stored near where it will ultimately be accessed. Existing distributed storage techniques have substantial availability and performance issues when failures occur.

BRIEF DESCRIPTION OF THE DRAWINGS

Various embodiments of the invention are disclosed in the following detailed description and the accompanying drawings.

DETAILED DESCRIPTION

Figure 1:
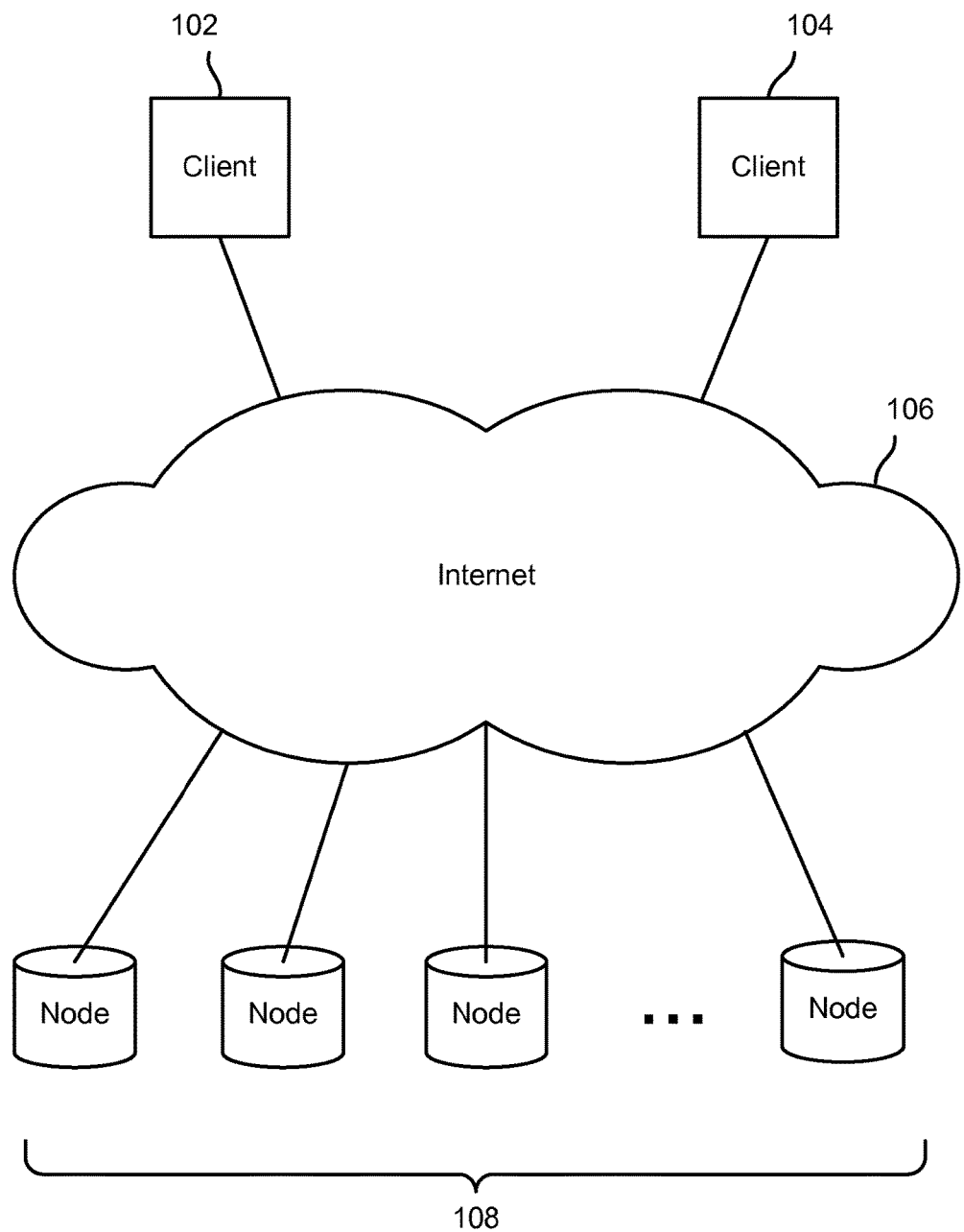
FIG. 1 is a block diagram illustrating an embodiment of a distributed content storage system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques for distributed content storage and retrieval are disclosed. Using a number of distributed system techniques, the disclosed object store spreads information redundantly across globally decentralized networks. In various embodiments, objects are stored near where they are most likely to be used, maximizing system availability, use of geographically dispersed resources, and end-user performance. The system shares object access and storage profiles via a distributed consensus mechanism. When an attempt is made to retrieve or store an object, the object identifier is scanned for features. The features are correlated to estimate the per-location frequencies of accesses to that object. For each potential storage location, network topology information is combined with these estimates to find the cost of that storage option. A deterministic function combines this cost data with administrator-configured policy to determine where data should be stored and how to retrieve objects. The function is constructed to result in fair and minimal object reassignment, even when storage locations are added or removed. In some implementations, administrative policy and index information is stored in a global overlay network. The design is heavily influenced by control system theory as the system is heavily damped and exhibits a ramped response to both usage and topology changes.

As used herein, the term "feature" refers to a property of an object identifier. Properties may be Boolean or may be represented by a confidence level between 0 and 1. Any object identifier can be said to possess a set of features. The term "Access Probability Matrix" refers to a matrix containing the probabilities that any given access to an object with a given feature was made from a given node, where the rows represent object features and the columns represent locations of requests. "Access Count Matrix" refers to a matrix with the same structure as the Access Probability Matrix except each cell contains a count of accesses rather than a percentage. A "node" is a computer or other device in the distributed system responsible for both object storage and object queries. Nodes and storage devices may be organized into a hierarchy. The hierarchy may contain as levels nodes, storage devices, and administrator-specified groupings of lower levels. As an example, there may be a hierarchy level called "continents" which contains North America, Europe, and Asia, each of which contain offices that contain nodes that contain storage devices. A "location" is any given entity in the hierarchy (for example, a specific office or a specific storage device).

The following matrix conventions are used:

$A^t$ denotes the transpose of matrix A $A_i^j$ denotes the value in row i, column j of matrix A 1 in a matrix equation denotes the row or column 1×n or n×1 matrix of the appropriate size filled with 1 values.

$C_j$ denotes the jth element of the vector C

The following probability conventions are used:

$P(A|B)$ denotes the probability of A being true given that B is true.

$F_i$ denotes presence of the feature represented by row i of the access probability matrix.

$N_j$ denotes the access will be performed by the node represented by column j of the access probability matrix.

$\hat{N}_j$ denotes the access will be performed by a node other than the one represented by column j of the access probability matrix.

FIG. 1 is a block diagram illustrating an embodiment of a distributed content storage system. In the example shown, one or more clients, represented in the example shown by clients 102 and 104, are connected via the Internet (and/or one or more other networks) 106 to a plurality of storage nodes 108. Each of the nodes 108 is configured to store data objects, such as files, comprising a body of stored content objects. In various embodiments, each of the nodes 108 gathers statistics locally, for example for each of one or more features how many objects having that feature have been accessed (or alternatively, recently accessed) at the node and/or how many objects having that feature are stored on the node. The nodes 108 cooperate via a distributed consensus mechanism to share access and/or storage statistics. Global access probability matrices are generated and distributed to the nodes, and are used at the respective nodes to make storage and/or object access decisions. For example, all else being equal an object may be stored on a node selected at least in part because the object has a feature or a set of features that results in it being determined at the node at which the storage decision (i.e., selection of one or more nodes on which to store the object) is being made, using gathered and distributed per feature access probabilities for the respective nodes, that the object to be stored is statistically likely to be accessed from (or from someplace near) the selected node. In various embodiments, cost information, such as the cost of accessing an object via a request made at (or near) a node A to a node B on which the object is stored, is considered along with the accessed and/or stored object statistics. In some embodiments, administrative policies also are enforced and factor into node selection. For example, if a first node A already has been selected to store an object and an administrative policy requires that two copies be stored in separate geographic locations, then a second node B that is not in the same geographic location as node A is selected to store the second copy.

Figure 2:
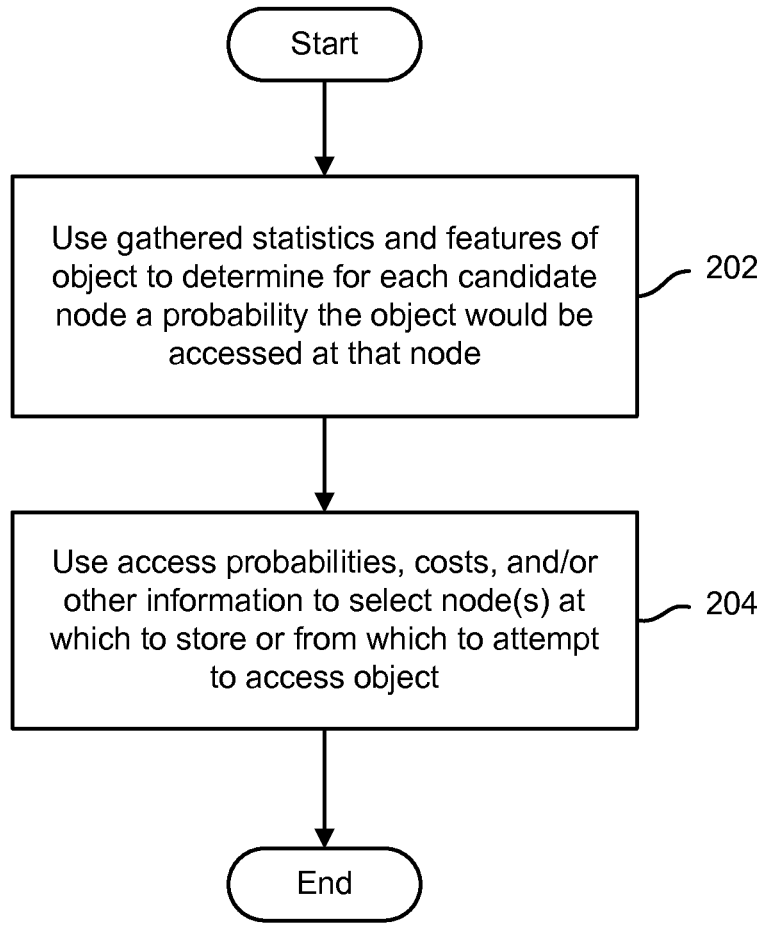
FIG. 2 is a flow diagram illustrating an embodiment of a process to access and/or store content objects.

FIG. 2 is a flow diagram illustrating an embodiment of a process to access and/or store content objects. In the example shown, when an object is to be stored or is desired to be accessed, previously gathered statistics (e.g., access and/or stored object counts per feature for each node, converted into access probabilities indicating for each node a likelihood that an object having a particular feature is stored and/or would be accessed at that node) and features of the object to be stored or desired to be accessed are used to determine for each candidate node a probability that the object would be accessed (and/or in some embodiments stored) at that node (202). The determined access probabilities, along with cost, administrative policies, and/or other information, are used to select one or more nodes at which to store and/or from which to attempt to access the object (204). In some embodiments, access statistics are used to select one or more nodes on which to store an object to be stored. In some embodiments, stored object statistics are used to select one or more nodes from which to request access to an object to be accessed. With respect to storage, the approach in various embodiments seeks to store objects in locations that maximize their availability at minimum cost, subject to requirements of administrative policies, to the users determined to be statistically most likely to access them. Likewise, in various embodiments with respect to access under the disclosed approach a requester attempts to retrieve content from a node determined based at least in part on shared accessed and/or stored object statistics and probabilities determined therefrom that is likely to have the object stored thereon, for example because a storing node likely would have chosen it to store the node based on the same (or related) statistics.

In various embodiments, each node within the system keeps a count per feature of how many times an access of an object containing that feature was initiated at that node. An access or other operation may be initiated within the distributed storage system at a node for various reasons (e.g. on behalf of a process running on the node or because of an external request from a user or client computing system received by that node). In addition, a count of the number of objects accessed from this node is maintained. Similarly, in some embodiments each node may keep a count of how many of its locally stored files have a given feature and the total number of files stored. When new access and storage profiles have been prepared and are ready for distribution, the nodes reach agreement on the new profiles via an atomic commitment protocol. This agreement includes both the profile itself and the time at which the profile will become active. By changing to the new profile atomically the system guarantees that nodes will always use consistent information for storage and search decisions. Delayed activation times also allow for multiple versions of the statistical profiles to be known to all nodes. This allows searching, storage, and exception list handling to make decisions using any or all available versions. For example, new storage decisions might use a profile that is not yet active but will become active soon. In one embodiment, the system could preserve the last four access profiles and be able to locate an object using the profiles for any objects stored according to those profiles without resorting to other means. In one embodiment, nodes ensure that all of their objects that will require an exception list entry after an access profile change have such an entry in the exception list before the access profile change takes effect.

Periodically the system aggregates feature access patterns from each node. This may be accomplished by a single actor within the system reducing the information, through a global MapReduce step, through a transactional agreement mechanism, or by other means.

Figure 3:
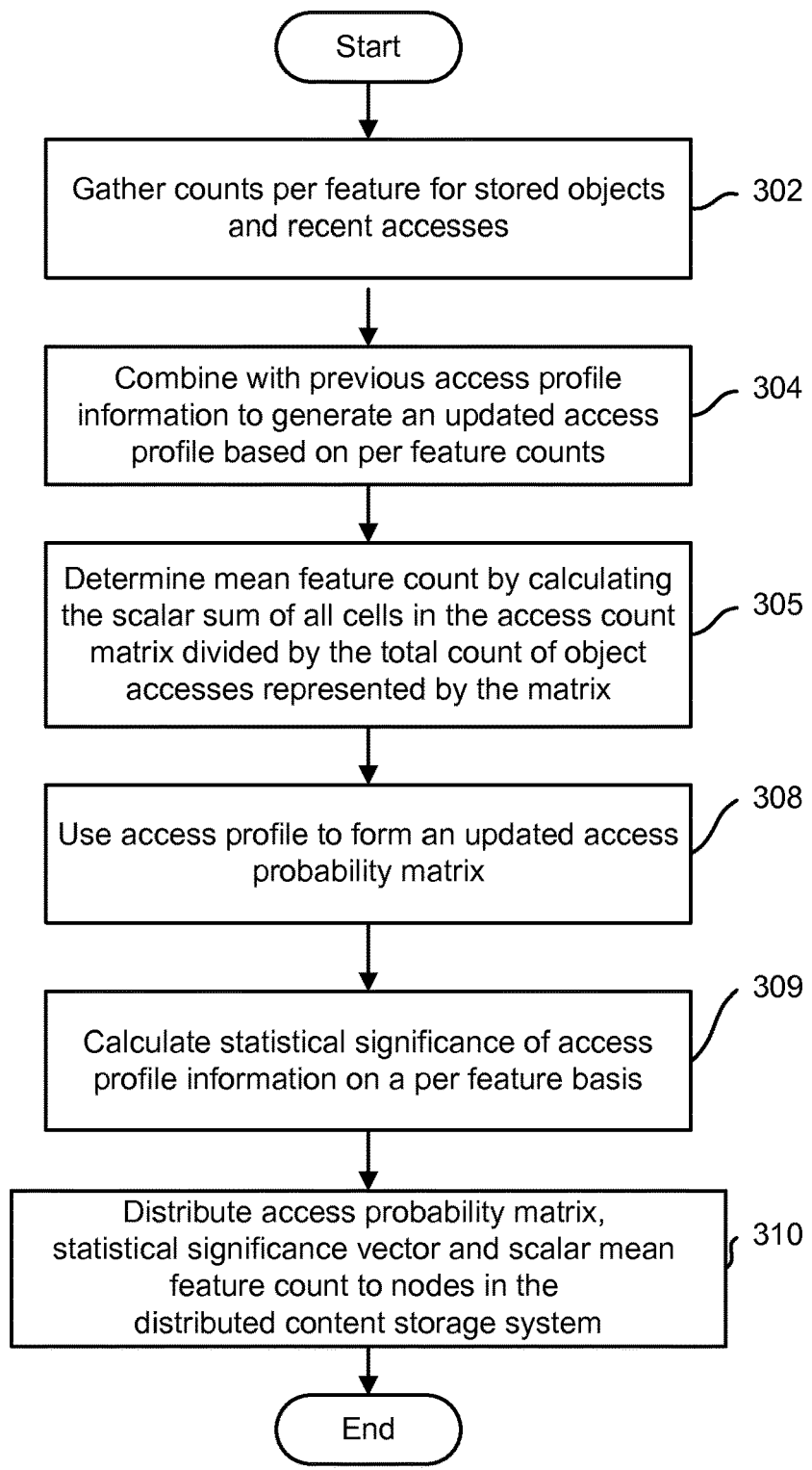
FIG. 3 is a flow diagram illustrating an embodiment of a process to gather and distribute access statistics.

FIG. 3 is a flow diagram illustrating an embodiment of a process to gather and distribute access statistics. The following key steps occur in various embodiments:

Counts per feature of stored files and recent accesses are gathered from each node (302). These counts can be combined to form matrices of the frequency of the respective count per location and feature pair. In some embodiments, access profile information is stored as a matrix where rows correspond to features and columns correspond to locations from which accesses occur. Over time, the storage profile will approach the access profile because storage locations are chosen based on the access profile. Storage counts represent the actual state of the system, not a dynamic trend, therefore they are most accurate when unfiltered. Each node knows exactly the values that should fill its column.

The information is combined with the previous access profile (304). It is often desirable to give greater weight to newer information. One way this can be accomplished is by using a low pass filter, such as an infinite impulse response filter, that considers recent information more important than historical data. Alternatively, global optimization techniques such as simulated or quantum annealing may also be used to find a new access profile that minimizes object relocations while approaching the most recently observed access statistics. Stochastic methods can be used to determine the score to minimize; alternatively a function can be used that scores based on how well the proposed access profile matches both the recently observed access rates and the counts of current storage locations by feature. This process prioritizes profile changes by comparing the cost of relocation with the access costs saved. The total count of objects accessed from each node can be maintained by the same procedure, along with a sum of the number of overall accesses performed by the entire cluster. As the weight of past observations is reduced, so too is the count of object accesses represented by the past data reduced by the same proportion. It is desirable but not necessary for the filter on the count data to guarantee all cells are non-zero. This prevents the Bayesian inference from interpreting the presence of any feature as an absolute guarantee of exclusion for any location.

The scalar sum of all cells in the access count matrix divided by the total count of object accesses represented by the matrix is calculated, giving the average number of object features present per access (i.e., mean feature count) (305).

A new access probability matrix is formed by dividing each value in the access count matrix by the sum of all cells in the matrix to yield an access probability for every pairing of features and nodes (308). In other words, this matrix stores in each entry the probability that a given feature of an access will be from the node corresponding to that entry's column and be the feature corresponding to that entry's row (subject to the skewing towards recent data provided by the filter). This probability corresponds to the expected proportion of accesses that will be for objects with these features from the respective location, which is an access frequency.

For each feature row in the resulting access probability matrix, statistical significance of the observation is calculated (309). This is performed by first finding the null hypothesis distribution represented by the sum of the access counts across all features and then computing the p-value for the row as compared to a null hypothesis distribution of the global access probabilities. This helps determine if a given row is a useful predictor of access location or if skew from the baseline distribution was created purely by chance. This is particularly useful when little data exists about a feature's access pattern.

The access probability matrix, statistical significance vector, and scalar mean feature count are distributed to the various nodes in the distributed storage system (310). In other embodiments, the counts are distributed to various nodes and the probability calculations are performed by the nodes after distribution. In various embodiments, the average number of features per object or the total number of objects are distributed as well.

Figure 4:
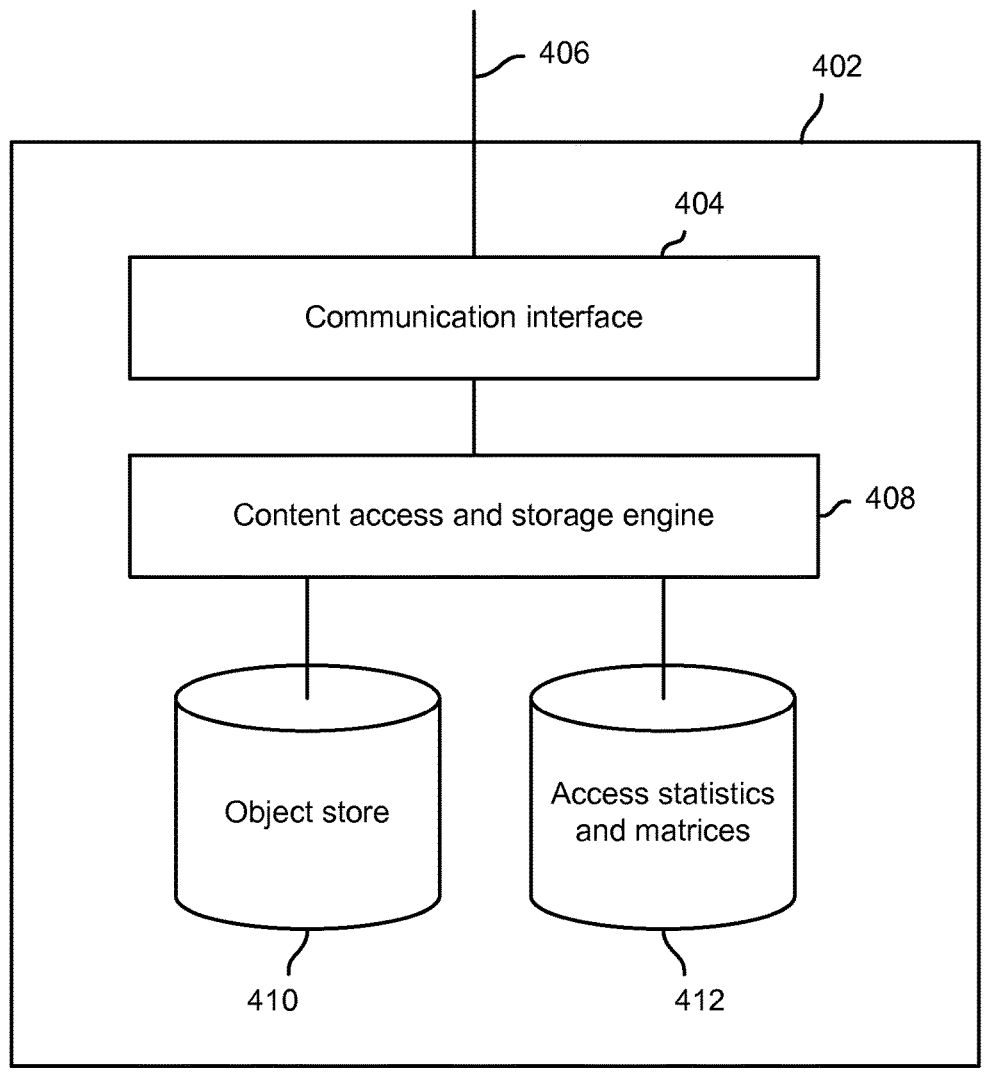
FIG. 4 is a block diagram illustrating an embodiment of a storage node.

FIG. 4 is a block diagram illustrating an embodiment of a storage node. In various embodiments, a storage node 402 may comprise a server or other computer. In the example shown, the node 402 includes a communication interface 404, e.g., a network interface card, which provides network connectivity via a connection 406. A content access and storage engine 408 communicates with clients and/or other nodes, via the communication interface 404 and connection 406, to perform tasks such as providing access to a request content object and storing a content object that is to be stored, e.g., on the node 402 and/or on a peer node. In some embodiments, content access and storage engine 408 comprises one or more software modules running on a processor. The content access and storage engine 408 in various embodiments is configured to store content objects in object store 410 and/or provide access to objects stored therein. In various embodiments, a node may have multiple local "object stores" (disks/storage locations). The content access and storage engine 408 maintains and stores in access statistics and matrices 412 local counts per feature for locally accessed and/or stored objects. Periodically content access and storage engine 408 reports local counts, for example to all peer nodes and/or to one or more central locations. In some embodiments MapReduce or other distributed techniques are used to collect the data. In some embodiments, the count data is transformed through a low pass filter or other damping mechanism before redistribution. Consensus mechanisms may be used to ensure that all access and storage engines share a common profile. The content access and storage engine 408 is configured to receive via interface 404 access probability and/or other matrices determined centrally and/or at a peer node based on per feature counts reported by the respective nodes in a cluster of nodes of which the node 402 is a member, and to use the matrices to make storage and/or access decisions about particular objects based on their respective features.

Figure 5:
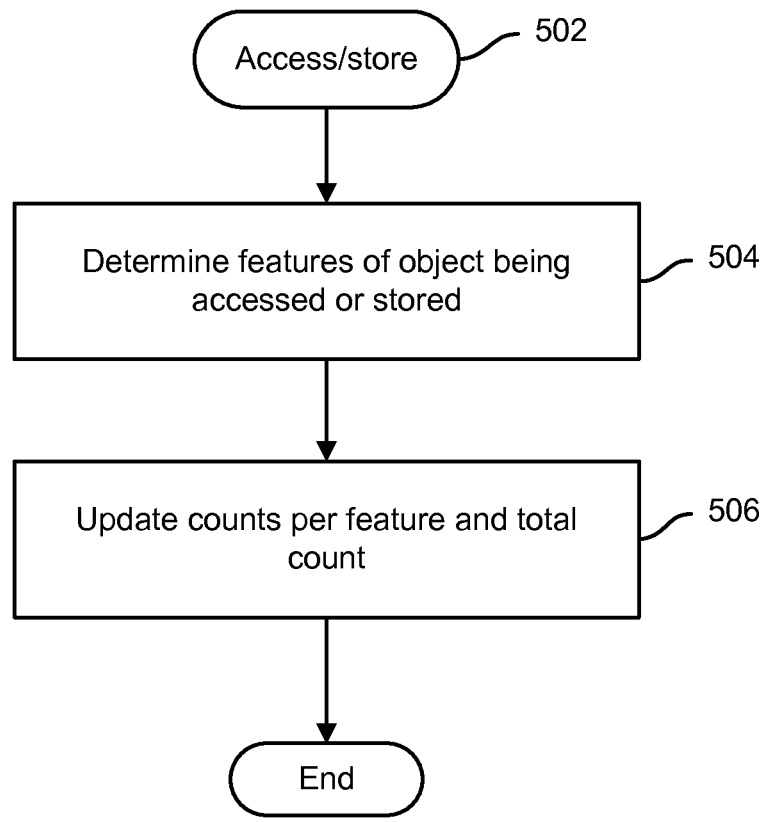
FIG. 5 is a flow diagram illustrating an embodiment of a process for maintaining statistics at a storage node.

FIG. 5 is a flow diagram illustrating an embodiment of a process for maintaining statistics at a storage node. In the example shown, each time an object is accessed and/or stored (502) features of the object being accessed/stored are determined (504) and applicable counts per feature are updated (506). For example, if an object having features 2, 3, and 5 of a set of six tracked features is accessed, respective per feature access counts for features 2, 3, and 5 would be incremented.

In some embodiments, object features are encoded or otherwise embodied in or discernible by interpreting directly the object's name. When the system attempts to access an object, it evaluates a function on the object name that interprets characteristics of the object name to generate a set of features. Characteristics can include hash values of object pathname components, letter and digraph frequency measurements, other statistical measures, or any combination thereof. The function must, for any given object name, return the exact same set of features.

The per feature access and storage counts may be maintained on a per-node basis. Alternatively, a node may maintain these counts for its disks by incrementing the access counts on each disk for each feature of an attempted access initiated by that node. The access count statistics on that disk then represent the frequency at which accesses have been initiated for objects containing features by node(s) that have contained that disk. Similarly, the node may maintain on each disk the counts of objects stored on that disk. In other embodiments, accesses may be maintained at locations in the storage hierarchy other than node and disk.

Figure 6:
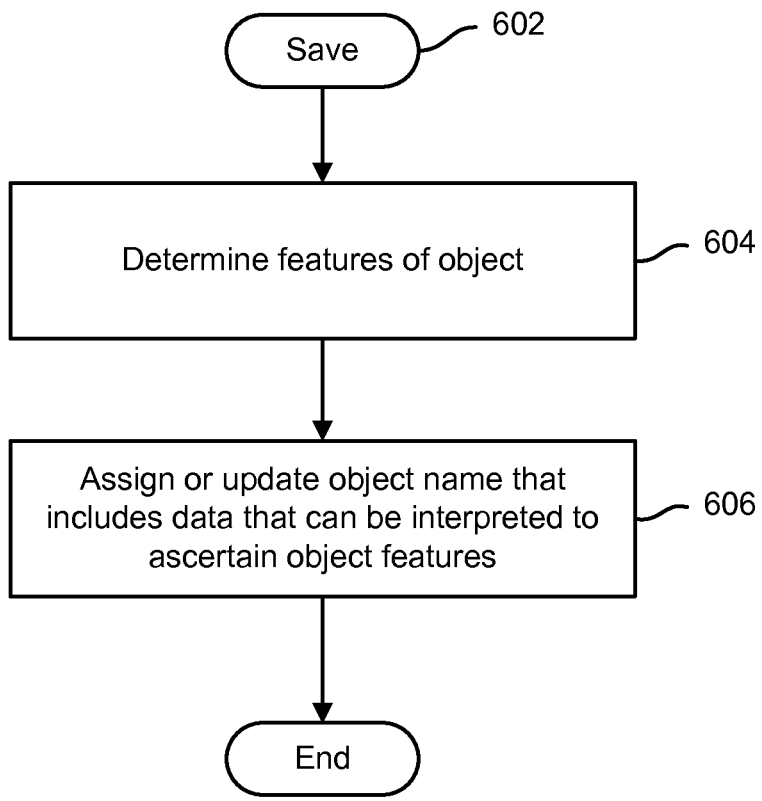
FIG. 6 is a flow diagram illustrating an embodiment of a process of encoding object feature information in the objects name.

FIG. 6 is a flow diagram illustrating an embodiment of a process of encoding object feature information in the objects name. In the example shown, when an object is saved (602) tracked features of the object are determined (604), e.g., based on data comprising and/or metadata about the object. The determined features are used to create (e.g., the first time the object is saved) or update (e.g., if a feature has changed since last access) a name by which the object is known in the distributed content storage system (606). In various embodiments, each feature is represented by a string included in the object name, so that any node in the distributed store can determine the feature by interpreting data comprising the object name, without having to check a global or other index entry.

In some embodiments, object features are determined through analysis of a global object name. Object names may be formed into hierarchies and features may be determined by a hash function computed for each portion of the hierarchy. Additionally, names or levels of a hierarchy encoded in a name may be decorated with various additional attributes extractable by a parser. Hashes of these attributes may provide features for an object. Various other implicit features may be extracted from an object name, such as digraph and trigraph frequencies. For instance, the most frequent trigraph may be considered a feature of an object while the other trigraphs are not, or a logistic function computed on the frequency of every trigraph may provide a confidence level for each trigraph feature.

Figure 7:
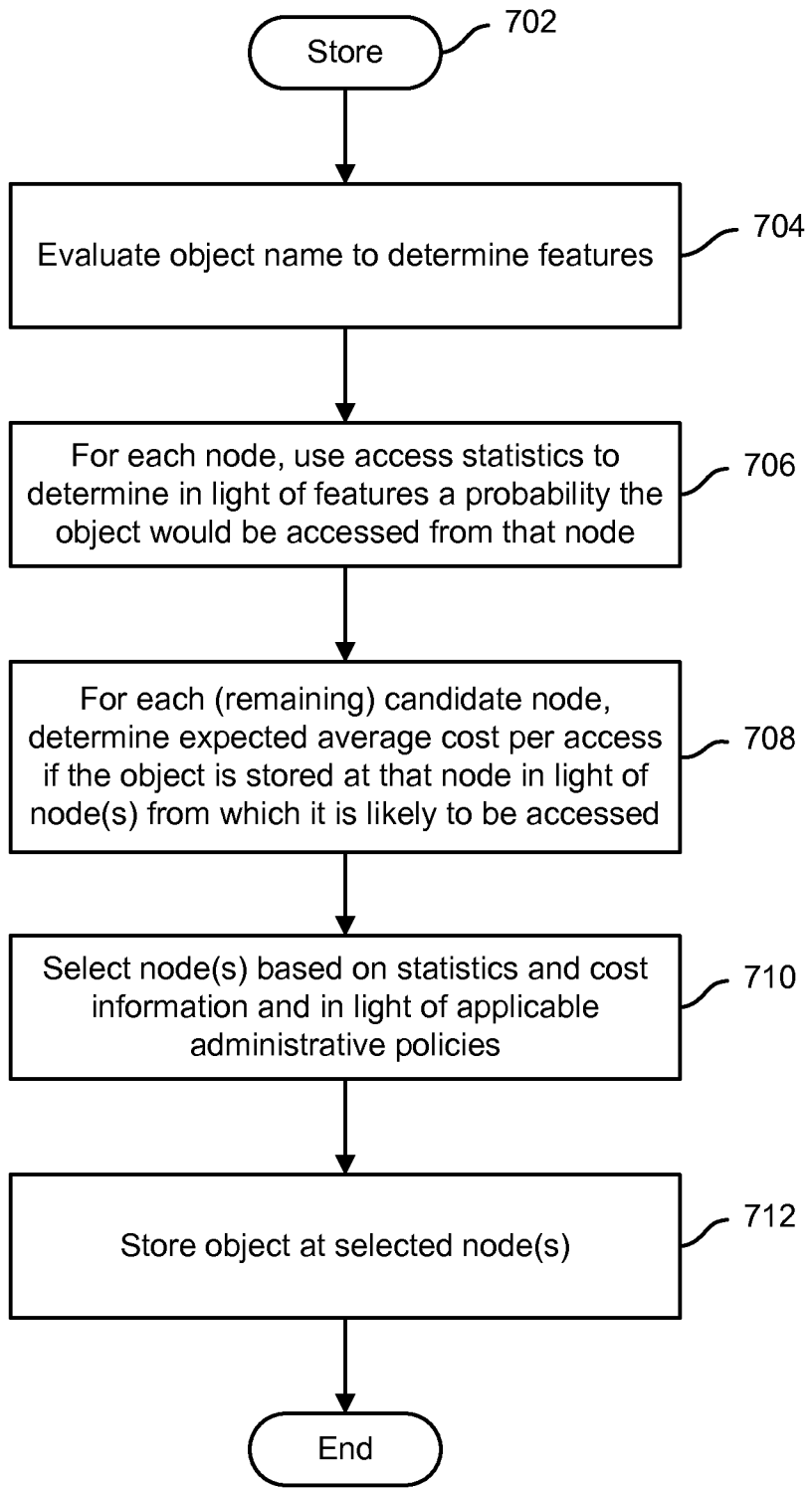
FIG. 7 is a flow diagram illustrating an embodiment of a process for storing an object.

FIG. 7 is a flow diagram illustrating an embodiment of a process for storing an object. In the example shown, when a request (e.g., from a client system) is received to store an object (702), the object's name is evaluated to determine which, if any, features comprising a set of tracked features is/are associated with the object (704). For each node that is (or remains) a candidate to store the object, access statistics (e.g., a cluster-wide access probability matrix) are used to determine in light of the object's features an expected frequency that the object to be stored will be accessed at that node (706). In some embodiments, prior to and/or in connection with determining per node probabilities a raw access probability matrix is adjusted to achieve a more even distribution of stored objects and/or copies thereof, as described more fully below. For each (remaining) candidate node, an average cost per access if the object were stored at that node is determined, e.g., considering the cost of communication between respective nodes and the likely nodes from which access requests are likely to be made, as determined based on the access probability matrix for example (708). The expected access frequency and cost information are evaluated in light of applicable administrative policies to select one or more nodes to store the object (710). For example, an administrative policy may provide that two copies of the object must be stored in different geographic locations. In some embodiments, 706, 708, and 710 are performed iteratively until a set of storage nodes that satisfies applicable administrative policies is determined. For example, an administrative policy may provide that two copies of the object must be stored in different geographic locations. A first node may be selected based on access probability and cost information. The first node and any other nodes that must be removed to comply with applicable administrative policies are removed from contention as candidates. In the current example other nodes in the same geographic location as the first node and the first node itself, for example, may be removed from contention, and a second node (necessarily not in the same geographic location as the first node, since all such nodes have been removed from contention) is determined, e.g., based on access probabilities and cost information as between the remaining nodes. The object is stored on the selected node(s) (712). In some embodiments, in addition to storing a copy of the object each selected node stores metadata about the object, including metadata indicating the other locations in which a "responsible" copy of the object is stored. In some embodiments, such information is used, for example, in the event of failure of a storage location, to migrate to nodes not affected by the failure a copy of each object stored within the failed location so as to restore compliance with a specified redundancy policy. In some embodiments, such information may be used in the event of failure of a storage location to ensure that the exception list is updated. The metadata stored on each node may be indexed so that entries can quickly be found that are also stored at a given alternative location. The metadata stored on each node also may be indexed so that entries can quickly be found that have a given feature. In the case that features are not Boolean the index may be ordered by the confidence level within each feature.

Figure 8:
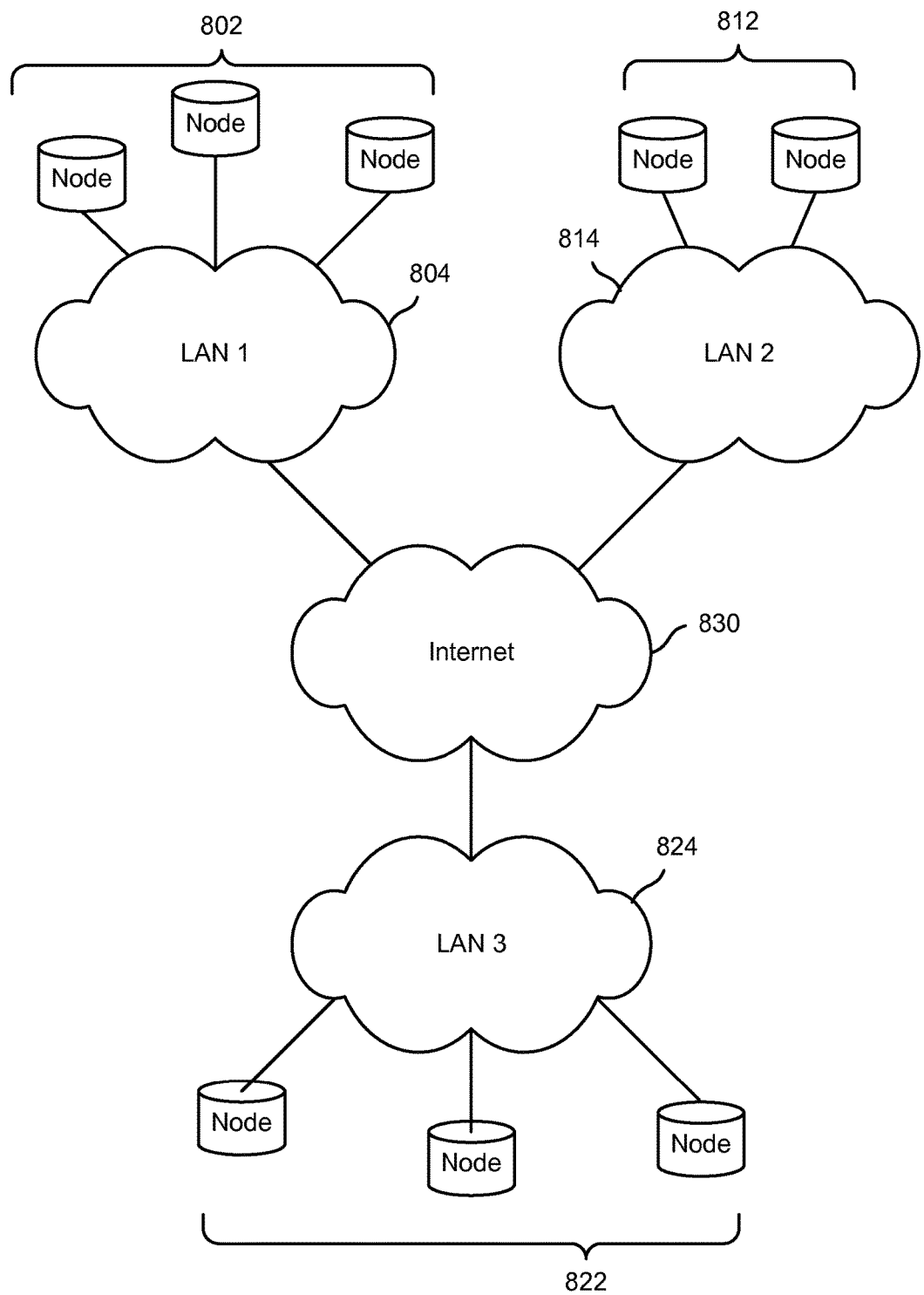
FIG. 8 is a block diagram illustrating an embodiment of a distributed content storage system.

FIG. 8 is a block diagram illustrating an embodiment of a distributed content storage system. In the example shown, the distributed content storage system comprises a cluster comprising three sets of storage nodes located at three separate geographic locations, for example, three geographic sites of an enterprise or other entity. Nodes 802 associated with a first local area network (LAN) 804, nodes 812 associated with a second LAN 814, and nodes 822 associated with a third LAN 824 are interconnected via the Internet 830. In this example, nodes are organized by geographic location, enabling administrative policies to be defined and enforced on a node and/or geographic basis, as in the example described above in connection with FIG. 7, in which an administrative policy required the second copy to be stored in a separate geographic location. Administrative policies may also be defined in terms of attributes assigned by the administrator to any storage location at any level of the hierarchy, including but not limited to disks, nodes, and geographic locations.

Figure 9:
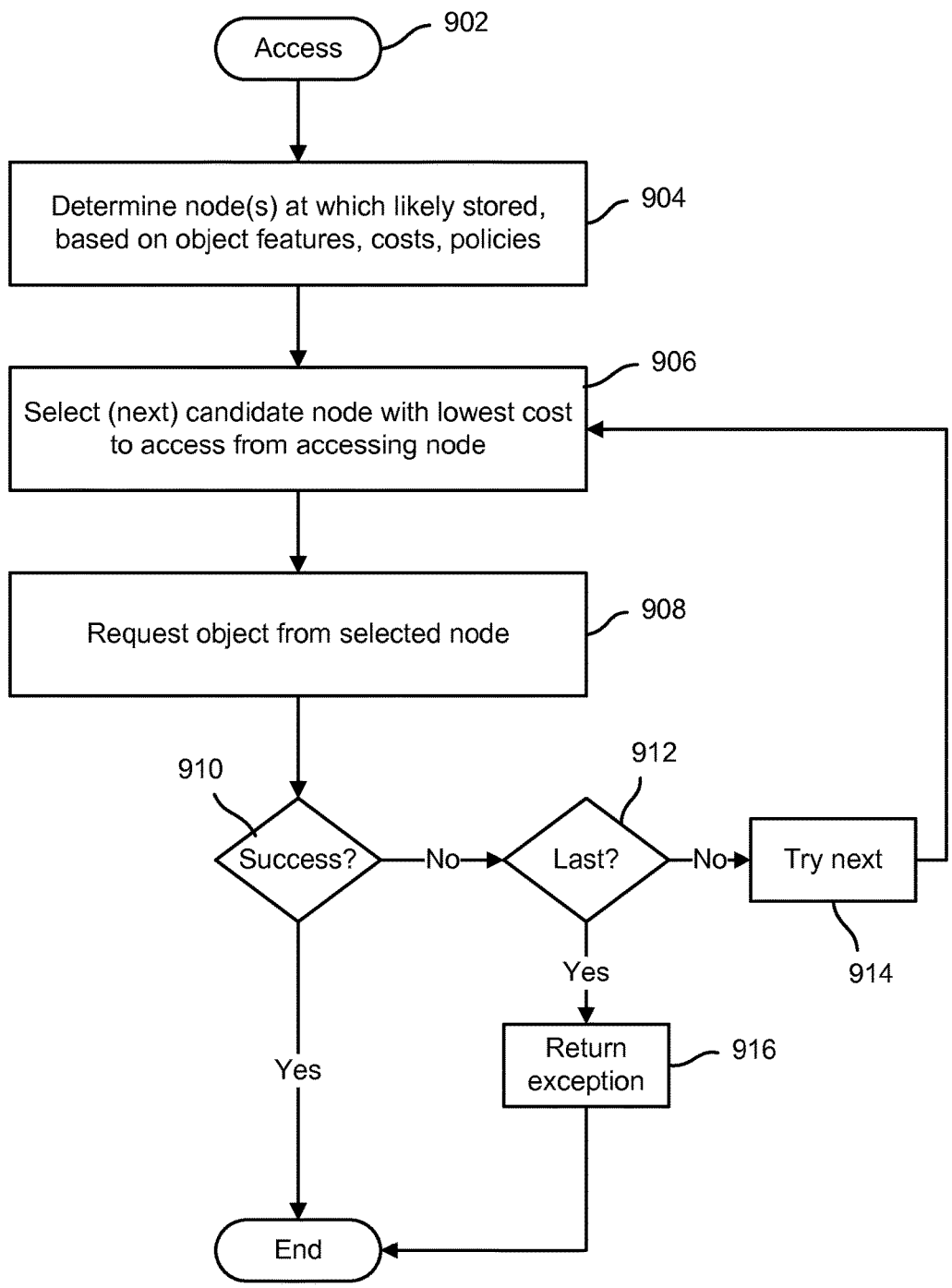
FIG. 9 is a flow diagram illustrating an embodiment of a process for accessing an object.

FIG. 9 is a flow diagram illustrating an embodiment of a process for accessing an object. In the example shown, a request is received, for example from a client computer, to access a content object named in the request (902). Object features are determined from the name, and a set of one or more nodes on which it is anticipated the requested object likely is stored is determined, e.g., based on access probabilities, cost information, and administrative policies, as described above (904). In some embodiments, to select a node from which to attempt to access a requested object, the node processing the access request determines, based on access statistics, cost information, and administrative policies, where the node would store the object if requested to do so. In some alternative embodiments, access probability information is used to select nodes on which to store an object, but stored object counts and probability information derived therefrom are used to select nodes from which to attempt to access a requested object. In some embodiments, prior to using access (or stored object) probabilities and other information to determine a node from which to attempt to retrieve a requested object, a local index is checked to determine whether the object is stored locally, and if so the object is served from the local store and the process of FIG. 9 is not completed. Once a node from which to attempt to retrieve the requested object has been selected, retrieval of the requested object is attempted from that node (908). If the attempt is successful (910), i.e., the selected node has a copy of and provides access to the object, the process ends. If not, it is determined whether any more candidate nodes remain to be checked (912). If so, a next candidate node is selected (914, 906) and an attempt is made to retrieve the object from that node (908). If the last node available to be checked does not have a copy of the object (912), an exception is returned (916) indicating that none of the nodes expected to have the object in fact had a copy, and the process of FIG. 9 ends. In some embodiments, an exception (916) results in a global exception index being checked to see if the object has been stored in a location/node identified in the index. If so, the object is retrieved from the node indicated in the index. If no copy can be found, an error is returned to the requesting client indicating the object does not exist in the distributed stored.

In examples that follow:

A is the access probability matrix as described in [0038] in connection with 308 of FIG. 3.

L is the vector of p-values per row calculated in [0039] as described above in connection with 309 of FIG. 3.

V is the scalar sum of all cells in the access profile matrix from [0037] described above in connection with 305 of FIG. 3, divided by the number of accesses from [0037].

In some embodiments, an access count matrix has one row per feature and one column per access location. An example matrix for six features and four locations after fifty accesses is:

$$T = \begin{bmatrix} 5 & 1 & 1 & 1 \\ 1 & 18 & 10 & 1 \\ 23 & 23 & 26 & 10 \\ 13 & 2 & 1 & 6 \\ 3 & 2 & 20 & 3 \\ 1 & 1 & 1 & 7 \end{bmatrix}$$

With this matrix the shared state values found are:

$$A = \begin{bmatrix} .0789 & .0053 & .0053 & .0053 \\ .0053 & .0947 & .0527 & .0053 \\ .1210 & .1210 & .1368 & .0526 \\ .0684 & .0105 & .0053 & .0316 \\ .0158 & .0105 & .1053 & .0158 \\ .0053 & .0053 & .0053 & .0368 \end{bmatrix}$$

$$L = \begin{bmatrix} 1.41 \times 10^{-5} \\ 1.76 \times 10^{-5} \\ 8.52 \times 10^{-1} \\ 1.11 \times 10^{-3} \\ 7.00 \times 10^{-5} \\ 2.15 \times 10^{-5} \end{bmatrix}$$

$$V = 3.8$$

In this example, the third feature's differences from the underlying access population have a high probability of occurring purely by chance. All other features have a high degree of significance, meaning that their differences are unlikely to have occurred purely randomly.

Once a set of features has been determined for an object, it is possible to approximate corresponding access probabilities. The system operates under the assumption that the prior probability of an object's access from a given node or location will correspond to the node or location's share of the total accesses. Assuming object accesses will happen with some base frequency, each location's share of the total accesses then corresponds to its relative frequency of originating access. These probabilities are updated in turn according to Bayes' Theorem by naïvely considering each feature as an independent observation of the probability of location. Even though dependencies between features may exist, this method will still be optimal if the dependencies distribute evenly in classes or if the dependencies cancel each other out.

For each new set of distributed values, the vector of column sums (representing the frequency of feature accesses corresponding to each node) is computed as:

$$C = A^t 1$$

A vector of row sums (representing the frequency of feature accesses corresponding to each feature) is computed as:

$$R = A 1$$

For each attempt to find or store an object the expected distribution is initialized to equal the global distribution:

$$C' = C$$

For each feature identified in the given object ID an iteration of Bayes' Rule is performed:

$$P(N_j \mid F_i) = \frac{P(F_i \mid N_j)P(N_j)}{P(F_i \mid N_j)P(N_j) + P(F_i \mid \hat{N}_j)P(\hat{N}_j)}$$

To calculate each iteration of Bayes' Rule, the following equations are used to find probabilities (adjusting for the fact that each object access will increment multiple feature counts):

$$P(N_j) = C'_j$$

$$P(\hat{N}_j) = 1 - C'_j$$

$$P(F_i \mid N_j) = \frac{V A_i^j}{C_j}$$

-continued $$P(F_i) = \sum_j P(F_i | N_j) P(N_j)$$

$$P(F_i | \hat{N}_j) = \frac{P(F_i) - P(F_i | N_j) P(N_j)}{P(\hat{N}_j)}$$

After each iteration of Bayes' Rule the system has a prior distribution, a posterior distribution, and a p-value associated with the previously evaluated feature. Rather than adopting the posterior distribution as the prior for the next iteration, the system may instead accept an intermediate value determined by using the p-value. One way to choose an intermediate value is to use a weighted mean with the p-value being the weight given to the prior and 1−(p-value) being the weight given to the posterior distribution. Since the system may be making decisions on features that have very little collected data, or features that are present in almost every object, it is desirable to prevent these features' probabilities from excessively influencing the predicted probability distribution. This excessive influence is prevented by weighting probability change by the feature's p-value. In some embodiments, for non-Boolean features the confidence level is included in these calculations such as by using the product of the confidence level and (1−pvalue) for the weight of the posterior distribution, and 1−(posterior weight) for the weight of the prior distribution.

Because the statistics provide access frequencies and object population by feature it is possible to detect features with disproportionately high access rates. Objects with these features are more likely to be hot content that justifies additional replication. In various embodiments, when an object is stored it may be checked against the absolute access frequency of locations at various levels in the hierarchy or combinations thereof. For any location with an absolute access frequency greater than some threshold amount and administrative policy not prohibiting storage at that location, an attempt to place an additional copy at that location may be made. Similarly, if any location observes after initial object storage that its access frequency to some object exceeds some threshold additional copies may be stored at that location to reduce the cost of access. Thus the system can make decisions about preemptive distribution of extra copies of an object. Similar properties may be obtained by allowing any node retrieving an object to store a local copy for a limited period of time. The limited period guarantees the object can be deleted later without cached copies lingering. This cache logic can use a least-recently-used eviction policy, or any other method used in content distribution networks or web caching schemes. Using caching to serve hot content results in a reactive rather than proactive replication of the file. However, caching trends towards a more immediately useful object placement.

Example

Storing an object with features 2, 3 and 5 without adjusting for significance the system first finds the prior expectation for object access location. Using the value of A from the example above, the system calculates C=A'1:

$$A = \begin{bmatrix} .0789 & .0053 & .0053 & .0053 \\ .0053 & .0947 & .0527 & .0053 \\ .1210 & .1210 & .1368 & .0526 \\ .0684 & .0105 & .0053 & .0316 \\ .0158 & .0105 & .1053 & .0158 \\ .0053 & .0053 & .0053 & .0368 \end{bmatrix}$$

$$C' = A^t 1 = \begin{bmatrix} .0789 & .0053 & .1210 & .0684 & .0158 & .0053 \\ .0053 & .0947 & .1210 & .0105 & .0105 & .0053 \\ .0053 & .0527 & .1368 & .0053 & .1053 & .0053 \\ .0053 & .0053 & .0526 & .0316 & .0158 & .0368 \end{bmatrix} \begin{bmatrix} 1 \\ 1 \\ 1 \\ 1 \\ 1 \\ 1 \end{bmatrix} = \begin{bmatrix} .2947 \\ .2474 \\ .3105 \\ .1474 \end{bmatrix}$$

For the first location the system calculates:

$$P(N_1) = .2947$$

$$P(\hat{N}_1) = .7053$$

$$P(F_2 | N_1) = \frac{3.8 \times .0053}{.2947} = 0.683$$

$$P(F_2) = .0683 \times .2947 + \ldots = .6000$$

$$P(F_2 | \hat{N}_1) = \frac{.600 - .0683 \times .2947}{.7053} = .8222$$

$$P(N_1 | F_2) = \frac{.0683 \times .2947}{.0683 \times .2947 + .8222 \times .7053} = .0335$$

Calculations occur for each location. After all locations are updated (preserving more precision) there is a new expected distribution:

$$C' = \begin{bmatrix} .0333 \\ .6000 \\ .3333 \\ .0333 \end{bmatrix}$$

The system repeats these steps for the other features present in the object to refine the expected access distribution. After processing all three features the final distribution is calculated as:

$$P = C' = \begin{bmatrix} .0114 \\ .1943 \\ .7744 \\ .0198 \end{bmatrix}$$

The resulting node probabilities effectively correspond to access rates (the relative number of accesses per time period predicted for this object). While knowledge of the relative access rates is useful, it does not identify the most economically efficient placement of the object. When integrating predicted access rates with network costs the following system is used in various embodiments.

In some embodiments, costs are determined experimentally and occasionally revised through distributed consensus. Resources and ancillary costs, such as access latency, are taken into account. These cost metrics combine both actual out of pocket costs (for instance $1 per gigabyte network transfer cost) and indirect costs (e.g., user wait time or bandwidth contention). Even for local accesses there is a base cost such as the opportunity cost of using disk I/O channels.

One interpretation of a cost matrix is for each row to represent a potential storage location, and each column to represent a potential source access location. The cells of the matrix then hold the cost metric per unit of access. The base cost appears along the diagonal of the cost matrix and is determined from local machine and LAN expenses associated with an access. This base cost increases as the relevance of WAN transfer cost decreases.

Denote the cost matrix $C_i^j$ where each element is the cost of accessing an object stored at location i from the source location j. Call the object-specific probability vector $P_j$ where each element is the probability of an access to the object from location j. Note that the probability vector P need not sum to 1 in some embodiments; relative probabilities are the important property. The vector $S_i$ given by the matrix product S=CP gives the expected average cost per access if the object is stored in location i.

For the locations of Los Angeles, New York, London, and Tokyo an example cost matrix follows:

$$C = \begin{bmatrix} 1 & 30 & 63 & 75 \\ 30 & 1 & 30 & 96 \\ 60 & 30 & 1 & 70 \\ 75 & 96 & 70 & 1 \end{bmatrix}$$

Using the vector P from the example above:

$$S = CP = \begin{bmatrix} 1 & 30 & 63 & 75 \\ 30 & 1 & 30 & 96 \\ 60 & 30 & 1 & 70 \\ 75 & 96 & 70 & 1 \end{bmatrix} \begin{bmatrix} .0114 \\ .1943 \\ .7744 \\ .0198 \end{bmatrix} = \begin{bmatrix} 56.12 \\ 25.67 \\ 8.67 \\ 73.74 \end{bmatrix}$$

In various embodiments, administrative policy is consulted before selecting any location to store data. All aspects of administrative policy may be global or instead vary by object identifier. If storage locations are prohibited by the policy, corresponding rows and columns in the cost matrix are removed. The corresponding entries in the location probability vector are also removed in this case. The policy may specify other adjustments, such as increasing the probability or affinity associated with a location. Administrative policy may also specify storage redundancy requirements that the system must meet when selecting locations and nodes. After all necessary adjustments are made and the costs associated with the expected access profile are determined, a storage location is selected (as described below). A set of nodes are chosen from the selected location consistent with the redundancy requirements specified in the administrative policy. If more storage locations are needed the system will adjust the cost matrix and probability vector for the next iteration, perform a new matrix multiplication, and choose the next storage location. Each time a storage location is selected administrative policy may disqualify other potential storage locations. For example, when an object requiring three copies in two geographical locations has already been stored twice in the same geographical location, all other potential storage selections in the same geographical location may be disqualified so as to prevent making a set of storage location selections that exceed the amount of redundancy required by the redundancy policy. This location and node selection process repeats until the administrative policy is satisfied. Administrative policy can be replicated among all nodes or stored in a reliable global data structure such as a skip graph.

In the following example describing selection of a storage node in various embodiments, the following terms are used:

$B_n$ is the bias of node n. The bias is non-zero and positive. The sum of all biases in a vector B is $B_{tot}$.

$H_n(o)$ is the hash of object o associated with the hash function corresponding to node n. All hashes are uniformly distributed in the same range $0 \leq H_n(o) \leq H_{max}$.

$H_{max}$ is the maximum possible hash value.

$\|R\|$ denotes the vector norm of vector R.

In a system that optimizes purely for lowest access cost the object would always be stored at the lowest cost location. Affinities are a measure of relative desirability that can be assigned to each possible storage location. The exact affinities are irrelevant; only their relative values are significant. Given a vector of costs per storage location S, the conversion to a categorical probability distribution can be accomplished by replacing each cost value with its reciprocal and then dividing each value by the sum of all of the values. This approach to converting affinities to probabilities allocates most data to the lowest cost choice while still choosing some higher cost locations. As a result, when a localized network failure occurs, replicas of many objects will exist in more distant and unaffected regions of the network. These replicas reduce the impact of failure for clients accessing data with a high affinity for the failed portion of the network.

After a location selection has occurred, a categorical probability distribution may be formed for child locations, such as nodes or disks, by dividing each node's affinity by the sum of all affinities in the location. Node affinities may be proportional to node resources, administrative preference, or any other consistent measure. Alternatively, a node categorical probability distribution can be determined globally by multiplying each node affinity by its location's affinity and taking the union of the resulting sets. This approach has a higher algorithmic cost and may result in spurious data migration in degenerate cases. In some embodiments, affinities may originally be calculated for the bottom-most level of the location hierarchy, such as specific disks, and thus avoid any iteration through child locations.

While statistical methods may indicate some objects have extreme affinity for one particular location, it is desirable for load balancing and fault tolerance to avoid overly strong biases. Any such adjustment should not change the ordering of locations by preference and should always pull towards a uniform distribution. It is desirable for the strength of pull towards a uniform distribution to increase with the strength of the bias. One system with these properties follows:

(1) The system interprets the d-dimensional vector of probabilities P as a point in a (d−1) simplex.

(2) The centroid of the (d−1) simplex is $$C = \left\langle \frac{1}{d}, \frac{1}{d}, \ldots, \frac{1}{d} \right\rangle.$$

This also represents the uniform probability distribution.

(3) A preference vector is calculated as R=P−C. The vector R sums to 0 so the important property that P sums to 1 will not be violated by adding any multiple of R. If all terms of R are 0 (that is, P=C) no scaling is done. The system takes F=P=C and the calculation is complete.

(4) The largest k is found such that kR+C is in the feasible region of all non-negative probabilities. This can be done by finding the smallest $P_n$ so that $\forall m: P_n \leq P_m$. Then $$k = \frac{-1}{d * R_n}.$$

(5) The maximally unfair vector M=kR+C is calculated given k.

(6) Given a scaling function Q(x), which provides a scalar coefficient from an unfairness ratio, the final adjusted probability vector is calculated:

$$F = Q\left(\frac{\|R\|}{\|M\|}\right)R + C$$

The scaling function Q(x) should have domain and range of [0,1]. For low inputs the desired output is near 1 because there is little incentive to ignore weak biases. When the input is near 1 the output should be smaller depending on the total number of nodes present in the cluster. Maximum output near $n^{-3}$ (for an n-location cluster) provides a decent balance between the conflicting needs of performance and reliability. Because it is desirable for lower inputs to remain close to their original value, the scaling function should be nonlinear. One scaling function with these properties is $Q(x)=1-ax^4$. The requirement that $Q(1)=n^{-3}$ then forces $$a = \frac{\sqrt[3]{n} - 1}{\sqrt[3]{n}}.$$

In the earlier example, an affinity vector was found indicating the average cost per access if the file is stored in one of the facilities of Los Angeles, New York, London, or Tokyo:

$$S = \begin{bmatrix} 56.12 \\ 25.67 \\ 8.67 \\ 73.74 \end{bmatrix}$$

The resulting probability vector is found by taking the reciprocal of each element in the vector and then dividing the resulting element by the sum of all results, such that the vector now sums to 1:

$$P_{temp} = \begin{bmatrix} 56.12^{-1} \\ 25.67^{-1} \\ 8.67^{-1} \\ 73.74^{-1} \end{bmatrix} = \begin{bmatrix} 1.78 \times 10^{-2} \\ 3.90 \times 10^{-2} \\ 1.15 \times 10^{-1} \\ 1.36 \times 10^{-2} \end{bmatrix}$$

$$P = \frac{P_{temp}}{1.86 \times 10^{-1}} = \begin{bmatrix} .096 \\ .210 \\ .620 \\ .073 \end{bmatrix}$$

The vector is then adjusted for better distribution:

$$R = P - C = \begin{bmatrix} .096 \\ .210 \\ .620 \\ .073 \end{bmatrix} - \begin{bmatrix} .25 \\ .25 \\ .25 \\ .25 \end{bmatrix} = \begin{bmatrix} -.154 \\ -.040 \\ .370 \\ -.177 \end{bmatrix}$$

$$k = \frac{-1}{4 * R_4} = 1.412$$

$$M = 1.412 \begin{bmatrix} -.154 \\ -.040 \\ .370 \\ -.177 \end{bmatrix} + \begin{bmatrix} .25 \\ .25 \\ .25 \\ .25 \end{bmatrix} = \begin{bmatrix} .032 \\ .194 \\ .773 \\ 0 \end{bmatrix}$$

$$Q(x) = 1 - \left(\frac{\sqrt[3]{4} - 1}{\sqrt[3]{4}}\right)x^4$$

$$F = Q\left(\frac{\sqrt{.096^2 + .210^2 + .620^2 + .073^2}}{\sqrt{.032^2 + .194^2 + .773^2}}\right) \begin{bmatrix} -.154 \\ -.040 \\ .370 \\ -.177 \end{bmatrix} + \begin{bmatrix} .25 \\ .25 \\ .25 \\ .25 \end{bmatrix} = \begin{bmatrix} .119 \\ .216 \\ .565 \\ .099 \end{bmatrix}$$

As the London location has the highest probability, assume it has been randomly selected. If the London location contains three nodes, one of which should be selected ⅗ of the time, and each of the others should be selected ⅕ of the time, a new probability vector for these nodes is formed:

$$P = \begin{bmatrix} .600 \\ .200 \\ .200 \end{bmatrix}$$

This process continues for as many levels of hierarchy as exist in the policy. While a two level policy consisting of facilities and nodes is convenient for explanation, this process can be applied to hierarchies of arbitrary depth. In one embodiment, administrators of the storage system define an arbitrary number of upper levels of the hierarchy, and the lowest level of the hierarchy is occupied by disks. In another embodiment, a single level of probability selection could be made over all bottom level storage locations. The latter embodiment may cause less churn in objects and better preserve the monotone nature of the underlying hash function, while the former embodiment is likely to be more efficient with large numbers of storage locations and complicated storage policy rules.

It is useful to distinguish between cached copies of objects and responsible copies of objects. Responsible copies engage in consensus protocols when an object is changed, and are aware of cached copies. This creates a small population of nodes for each object that are intimately involved in object modification and deletion. It is desirable for the number of responsible copies to be small so as to not involve an excessive number of nodes in each modification, but to be large enough that failure is not likely to render the object unavailable. Most long-lived copies of objects are responsible copies, while cached copies are used for ephemeral storage. Literature regarding consensus protocols often discusses the roles of proposer, accepter, and learner. Within that framework, responsible copies perform the role of accepter and of learner while cached copies may participate solely in the role of learner to maintain the freshness of the cache. In some embodiments, all nodes may participate as proposers. In other embodiments, the role of proposer for consensus purposes is limited to the set of nodes holding responsible copies.

Consistently predicting where objects will be stored eliminates the need for keeping a global object index. However, unpredictable situations such as resource exhaustion or failures may require a storage selection at a node that is not the absolute first in the preference list. In this case, it is desirable for clients searching the network to have a consistent fallback strategy that allows them to find the few objects stored in less preferred locations. It is also desirable that clients are quickly and definitively able to determine that an object identifier is not present anywhere in the system. Each copy of an object will have metadata which identifies the other nodes currently responsible for object copies and references. This metadata is useful both for quickly identifying nearby copies of a resource and for performing reliable delete operations. When a node is suspected to have failed, all other nodes can quickly search their local metadata indexes to identify the objects that no longer satisfy their minimum replication policy. When resources are available, a node currently responsible for the object distributes a cached copy and then reaches agreement with the responsible nodes that the cached copy has become a responsible copy. A similar process occurs when changes in placement statistics cause a change in node preference for some set of objects. The system limits object migrations such that changes in network topology do not cause a debilitating level of relocations.

Figure 10A:
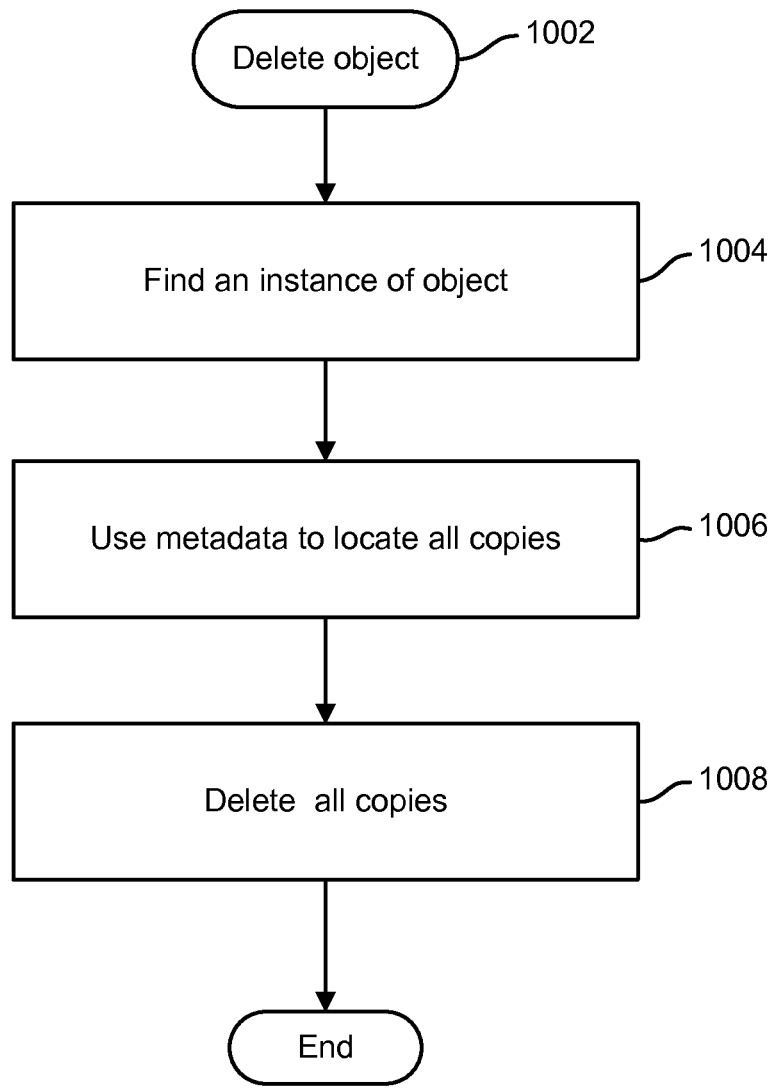
FIG. 10A is a flow diagram illustrating an embodiment of a process for deleting an object from a distributed content store.

FIG. 10A is a flow diagram illustrating an embodiment of a process for deleting an object from a distributed content store. In the example shown, a request to delete an object is received (1002). An instance of the object is found (1004), for example in the same manner as in FIG. 9. Metadata associated with the object, as stored with the object at the node at which the instance was found, is read and used to locate all "responsible" (as opposed to cached) copies of the object (1006), that is, copies stored to satisfy administrative policies regarding storage location(s), degree of redundancy, etc. All responsible copies are deleted (1008). In various embodiments, any cached copies, if any, are purged through normal caching operations, e.g., once it is determined that the cached object copy no longer corresponds to a valid responsible copy as stored in any node.

Figure 10B:
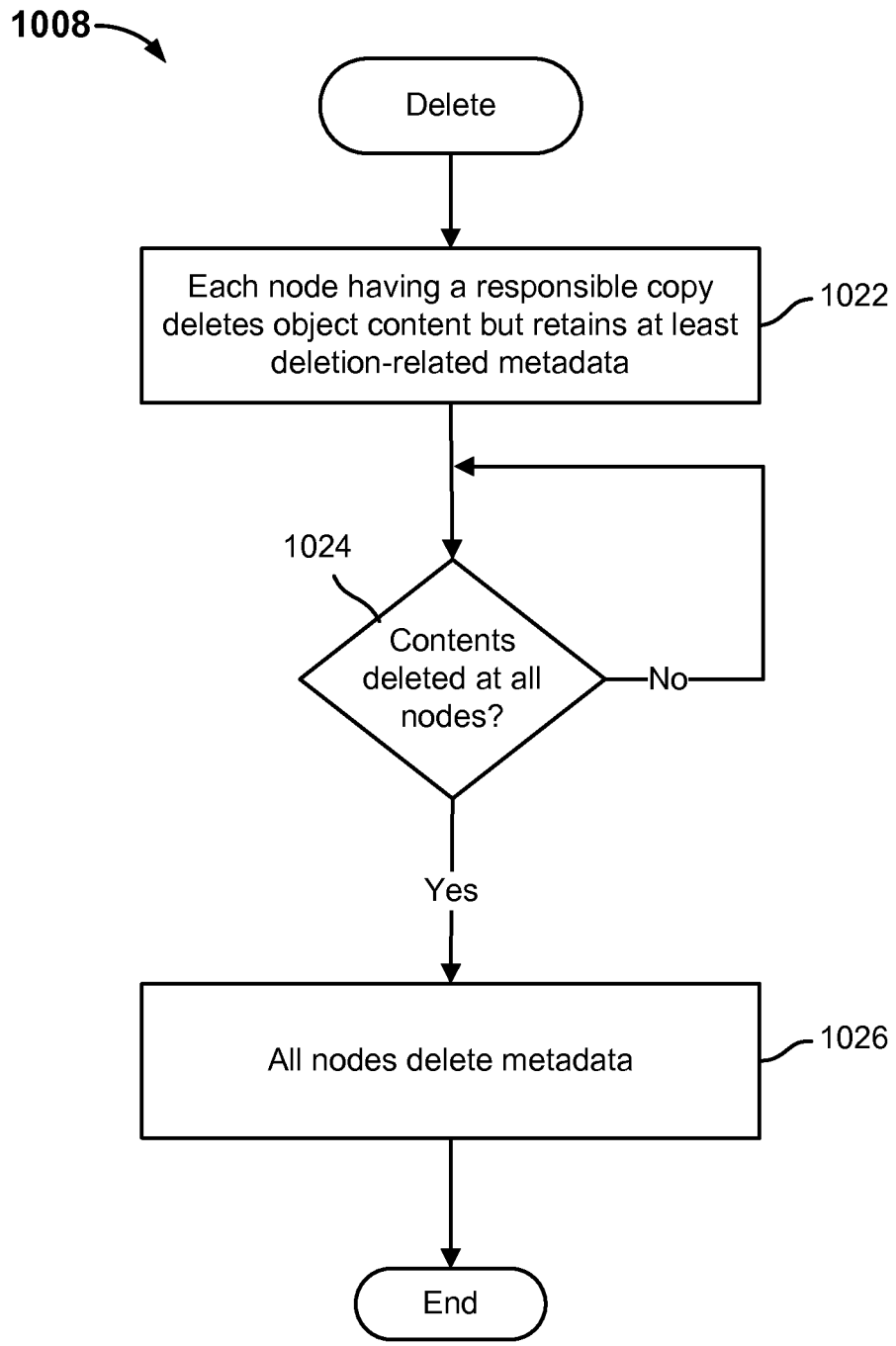
FIG. 10B is a flow diagram illustrating an embodiment of a process for reliably deleting responsible copies of an object.

FIG. 10B is a flow diagram illustrating an embodiment of a process for reliably deleting responsible copies of an object. In some embodiments, the process of FIG. 10B implements step 1008 of FIG. 10A. In order to safely delete files in the event of network partitions, in some embodiments a file delete request proceeds through several stages. In the first stage, nodes may erase the contents of the object but must retain metadata that indicates that the file is being deleted along with information about the current stage of the delete process (1022). In some embodiments, the status of the delete process can be maintained using a distributed consensus protocol. In some embodiments, this retained metadata may track which other nodes have confirmed marking the file as deleted. Alternatively, nodes may periodically query other responsible nodes for their delete status to identify any files where all participants have entered at least the first stage of delete. Once all responsible copies are known to have started the delete process, the second stage of delete can begin (1024). In some embodiments, nodes may choose to notify all responsible peers that the second stage has begun. In the second stage, the metadata for the file can be removed (1026).

Figure 11:
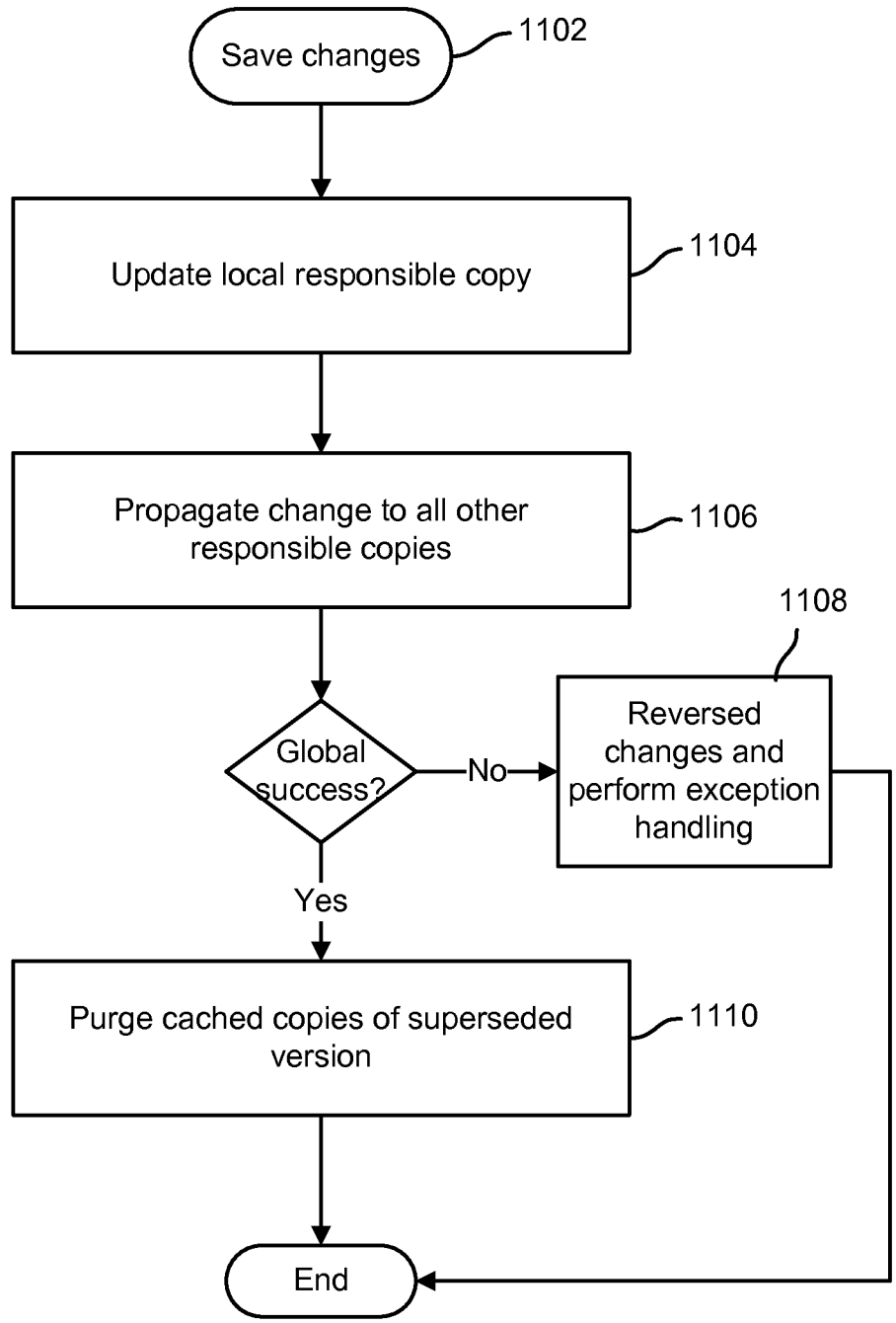
FIG. 11 is a flow diagram illustrating an embodiment of a process for saving changes in a distributed content store.

FIG. 11 is a flow diagram illustrating an embodiment of a process for saving changes in a distributed content store. In the example shown, an indication is received to save changes to an object (1102). A local responsible copy of the object is updated to reflect the changes (1104). Locally stored metadata indicating the location of other responsible copies is used to propagate the changes to other responsible copies (1106). In some embodiments, once confirmation is received that all responsible copies have been updated to reflect the changes to be saved, the requesting client/application is notified that the save has been completed. If the change is abandoned before successful completion because of failure of or rejection by the consensus protocol then the changes are reverted (1108). Alternatively, in some embodiments, changes are not applied until after being accepted by all responsible nodes. Cached copies of the superseded version of the object are purged, e.g., through normal cache management processing (1110).

Figure 12:
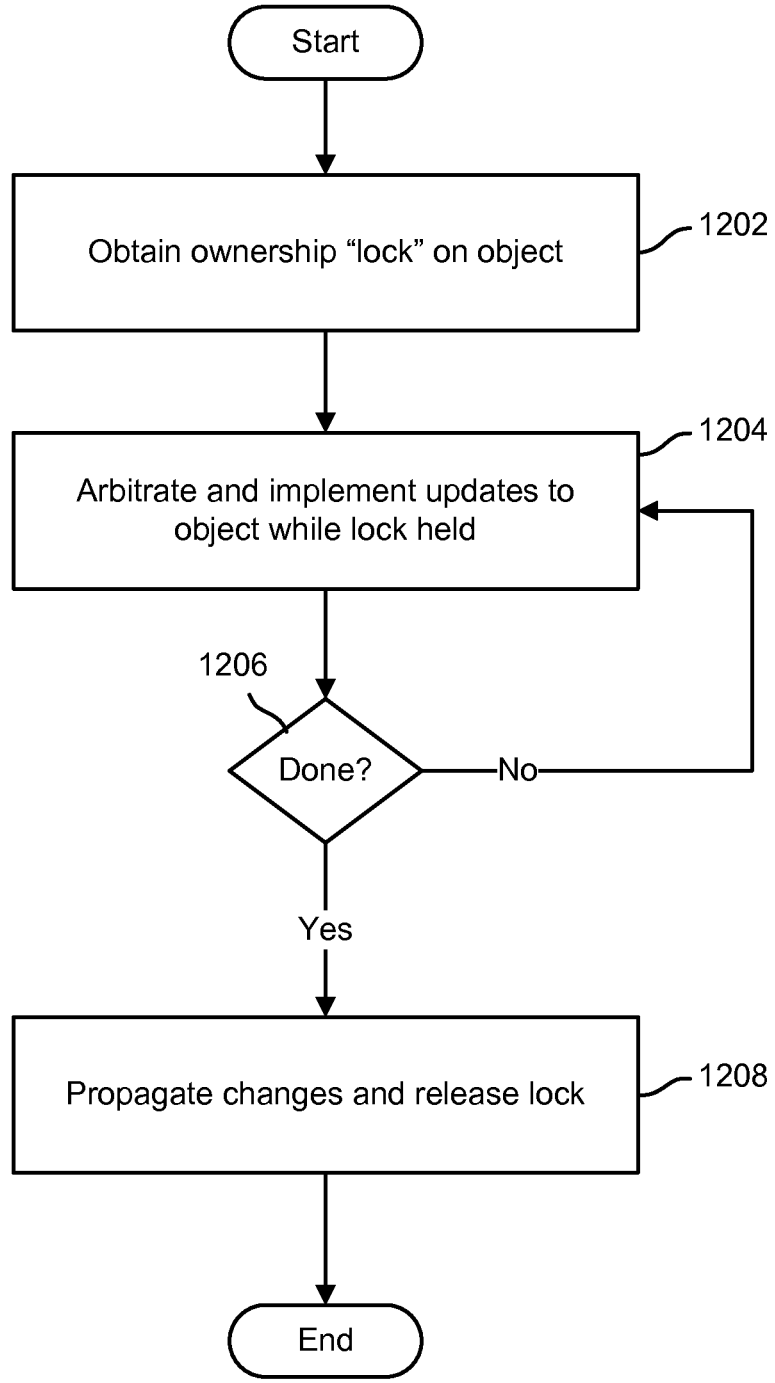
FIG. 12 is a flow diagram illustrating an embodiment of a process for making changes to an object stored in a distributed content store.

FIG. 12 is a flow diagram illustrating an embodiment of a process for making changes to an object stored in a distributed content store. In the example shown, an ownership "lock" is obtained on a content object (1202). The lock informs other nodes that changes to the object must be coordinated through the node that holds the lock. In various embodiments, this enables a node to make successive changes over a period of time without having to coordinate with other nodes at which a responsible copy of the object is stored. The node that obtains the lock coordinates changes made at/by other nodes, including by arbitrating or otherwise resolving any conflicts, and implements changes committed at any node in the object as stored locally (1204). Once the node is done updating the object (1206), it propagates to other nodes at which a responsible copy of the object is stored accumulated changes made at/by any node during the time the lock was held and releases the lock (1208).

In various embodiments, nodes initiate changes to content objects by providing representations of changes to the distributed consensus protocol over the set of nodes that contain responsible copies of that object. The representations of these changes are provided to all responsible nodes. The distributed consensus protocol may provide a total or partial ordering in which to apply the changes. This can reduce the amount of network traffic required to make a change across all copies of an object and allow an increased amount of parallelism in modifying the content object.

In various embodiments, exception policies determine how an object is stored and/or from where it is attempted to be accessed, for example if a prescribed number and mix of nodes at which to store the object in a manner that satisfies all applicable administrative policies cannot be determined, e.g., due to the unavailability of one or more nodes, etc., and/or a number of access attempts that should have resulted in successful retrieval of a requested object all have failed.

Under the Any N of M exception policy the client is guaranteed that of the first M nodes in the preference list, at least N of them will contain a copy of the object, or at least a reference to where a copy can be found. This requires the client to contact at least M−N+1 nodes before falling back to the global exception index. Only after contacting M−N+1 nodes, and checking the global exception index, can a client definitively say that an object does not exist. Objects should still be stored as close to the start of the preference list as possible to reduce the total network round trips necessary to find the object. In the special case that N=1, the Any 1 of M exception policy requires the client to contact all M nodes before checking the exception list.

Under the First N exception policy the client has the stronger guarantee that the first N nodes must all have object copies or references. In the event of failure of any of the first N nodes, the client will fall back to subsequent nodes in the preference list. If all N nodes are unavailable the client will reference the exception list. If any one of the nodes is available, and does not have a copy of the requested object, the client can revert to checking the exception list. While this reduces the number of network round trips required to locate an exceptional or non-existent file compared to the Any N of M policy, it also increases the amount of storage necessary to store the global exception list. In the special case that N=1, the preference list is used directly as a selection function. If the object is not stored on the first node in the preference list, it must be listed in the global exception index.

Figure 13:
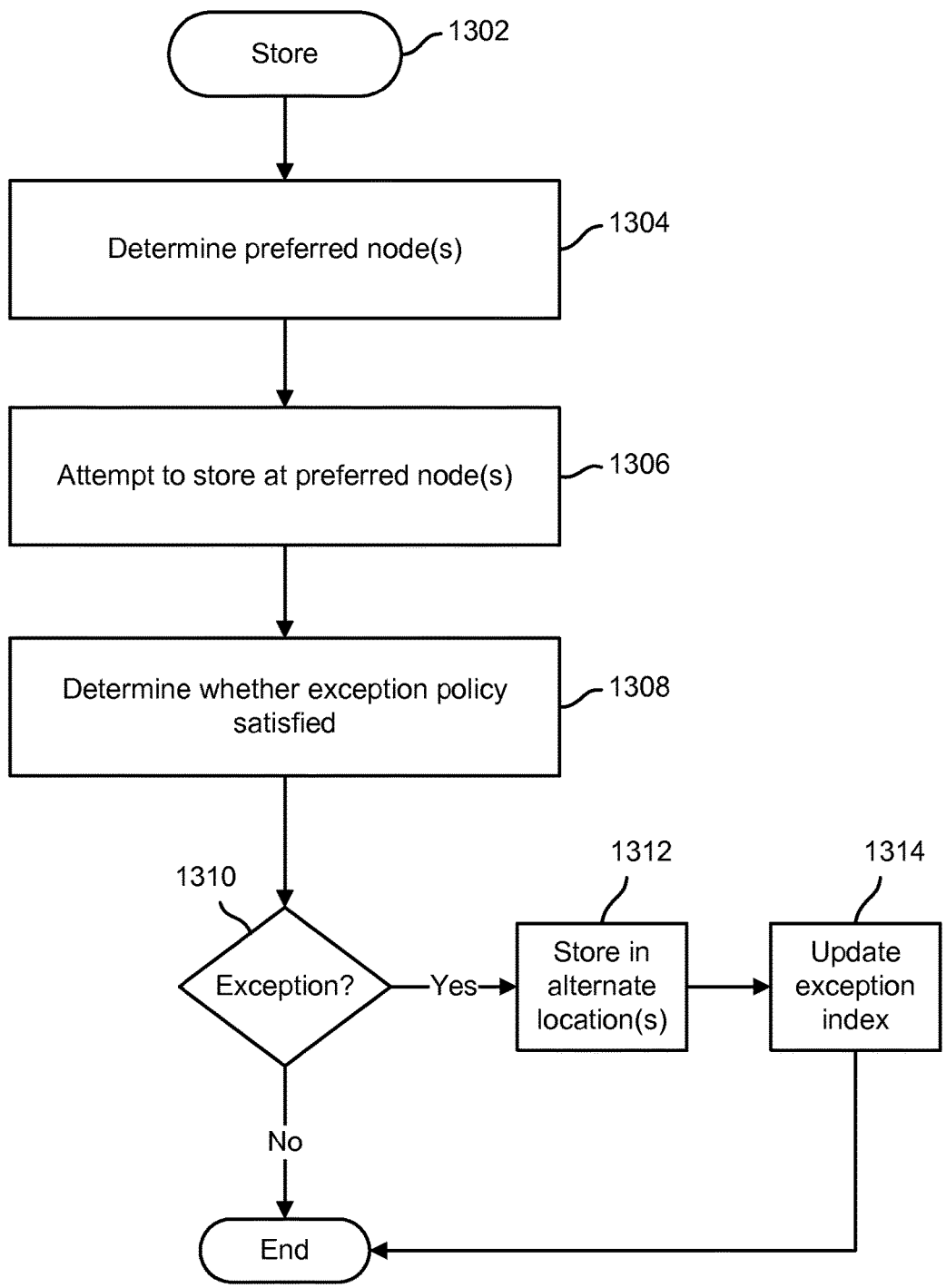
FIG. 13 is a flow diagram illustrating an embodiment of a process for storing an object.

FIG. 13 is a flow diagram illustrating an embodiment of a process for storing an object. In the example shown, a request to store an object is received (1302). One or more preferred nodes at which to store the object are determined (1304), for example based on access probabilities, cost, and/or administrative policies as described above. An attempt is made to store the object at the preferred node(s) (1306). It is determined whether an applicable exception policy has been satisfied (1308), e.g., whether the object was stored successfully in at least any N of M preferred nodes. If the exception policy is satisfied (i.e., no exception) (1310), the process ends. If the exception policy is not satisfied, then one or more alternate locations (not preferred) are selected and used to store the object (1312) and a global exception index is updated to reflect where the (additional) copies are stored (1314).

Figure 14A:
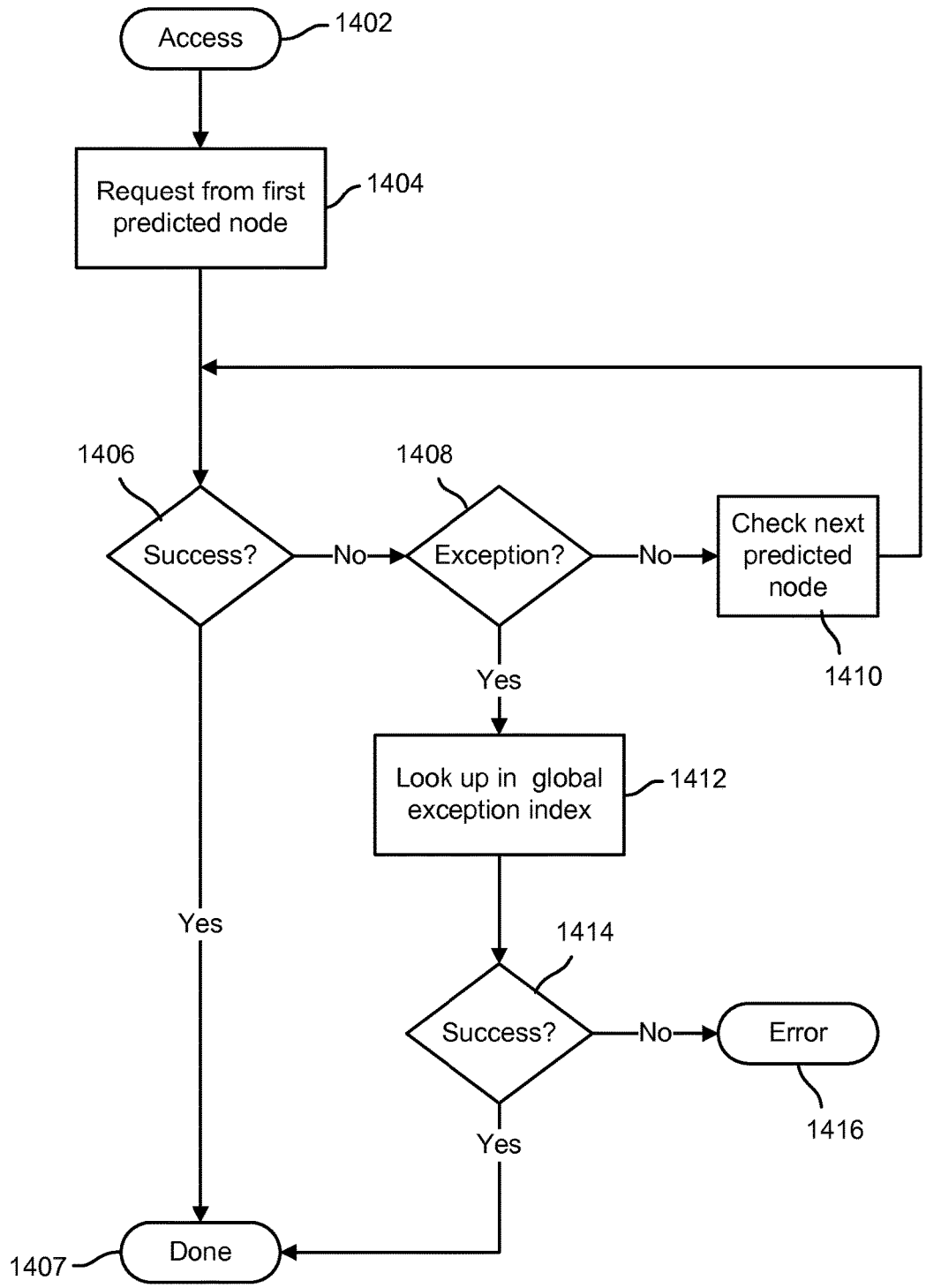
FIG. 14A is a flow diagram illustrating an embodiment of a process for accessing an object.

FIG. 14A is a flow diagram illustrating an embodiment of a process for accessing an object. In the example shown, a request to access an object is received (1402). A node from which to attempt to retrieve the object is determined, e.g., based on object features, access probabilities, etc., as described above (1404). If the object is retrieved successfully (1406), the process ends. If not, it is determined whether the number and/or mix of node(s) checked so far without success indicates that exception handling should be performed (1408). For example, if an any N of M exception policy applies and N nodes out of a determined preferred M nodes have been checked without success, it would be determined that the exception policy is not satisfied. If there is not (yet) an exception (1408), a next predicted node is checked (1410), and successive nodes are checked until the object is retrieved or an exception determined (1410, 1406, 1408). If an exception occurs (1408), the object is looked up in a global exception index (1412). If an entry is found (1414) the object is retrieved from an indicated node and the process ends. Otherwise, an error (1416) indicating the object does not exist is returned.

Exception indexing should be efficient from the perspective of search and storage costs. The statistical tables used to predict storage locations may be constrained to drift slowly so changes in predicted storage location do not trigger large or frequent changes to the exception list. One way to provide this constraint is to pass all of the statistical data through a low-pass filter. Because the global exception index must grow whenever objects are stored in a location that does not fit the exception policy, it is desirable to also shrink the exception list over time, so that the system can reduce the need for frequent exception index lookups. If each object's entry in the exception list is prefixed with an identifier representing the object's preferred node, a skip graph can easily be formed which will tend to store exceptions on the object's preferred storage node. This allows the preferred node to rapidly redirect clients to a valid copy and provides an easy working list of objects that can be duplicated locally and removed from the global exception list. In some implementations, preferred nodes may hold metadata with a list of storage locations where the object can currently be found without holding the contents of the object. This allows quick discovery of the current responsible copies before the need to fall back to the exception list is known to the searcher.

The global exception index can be stored in any distributed topology, such as a skip graph or an LH* data structure, with buckets assigned directly to nodes. It is essential that the distributed data structure gracefully handle the addition of new locations or other changes in network topology. However it is stored, the distributed data structure itself provides a partitioning of the exceptions among the nodes. Each node can use its spare resources to identify ways to resolve the exceptions for which it is responsible. When network resources are available, requests can be made for relocations to occur and reduce the size of the exception index.

Preferred nodes can also reduce the exception list size by reacting to requests for objects they do not have. If the First 1 exception policy is in place, the first node may choose to check the exception index itself any time it receives a request for an object. If the object exists in the exception index, and the primary node has space available, it may immediately cache a copy of the object and may also join the list of responsible nodes. Once the preferred node has a copy of the object the exception index space can be freed along with the storage space used for the less preferred copy. When the first request is performed, the node may store a cached copy of the object locally. Subsequent requests may cause the node to register as a learner for the changes happening on the object. The node may also register its copy as a fully responsible participant in the object, thus allowing its removal from the exception list. In some embodiments, modifications to the object metadata can be made through the same consensus protocol that is used for updating the contents of the object. All participants, whether learner or responsible, may be listed in the metadata along with which role(s) they are participating in. In various embodiments, these modifications to the metadata may be immediate or may be delayed in their activation until triggered by some later event, such as a checkpoint proposal or a timer expiration. Objects are created with some initial responsible member list and every change after that point is a result of consensus among the responsible membership at the time the change is proposed.

Ensuring that file creation is atomic requires special consideration in a distributed system. Because an object might be stored on storage locations that are not the preferred locations, some secondary atomic catalog is necessary. One method of ensuring creation is atomic is by having a globally shared catalog of objects and performing an atomic commitment protocol to modify the catalog of existing objects. Another method is to ensure that the exception list is stored in a data structure that allows trivial implementation of atomic insert operations in a distributed system, such as a skip graph. In some embodiments, both methods may be mixed. For example, objects for which all nodes or a substantial portion of all nodes are responsible may be listed in a global catalog maintained through consensus operations while objects that are stored on a smaller subset of nodes may rely on the atomic properties of the global exception index. A distributed data structure such as a skip graph that ensures assignment of data within a given partition to a narrow subset of the node population may maintain consistency by requiring communication between adjacent nodes to change the boundaries of partitioning. In the event that an adjacent node is unavailable, healing actions such as reforming the graph with the failed node omitted require an atomic commitment protocol that avoids partitioning problems.

Figure 14B:
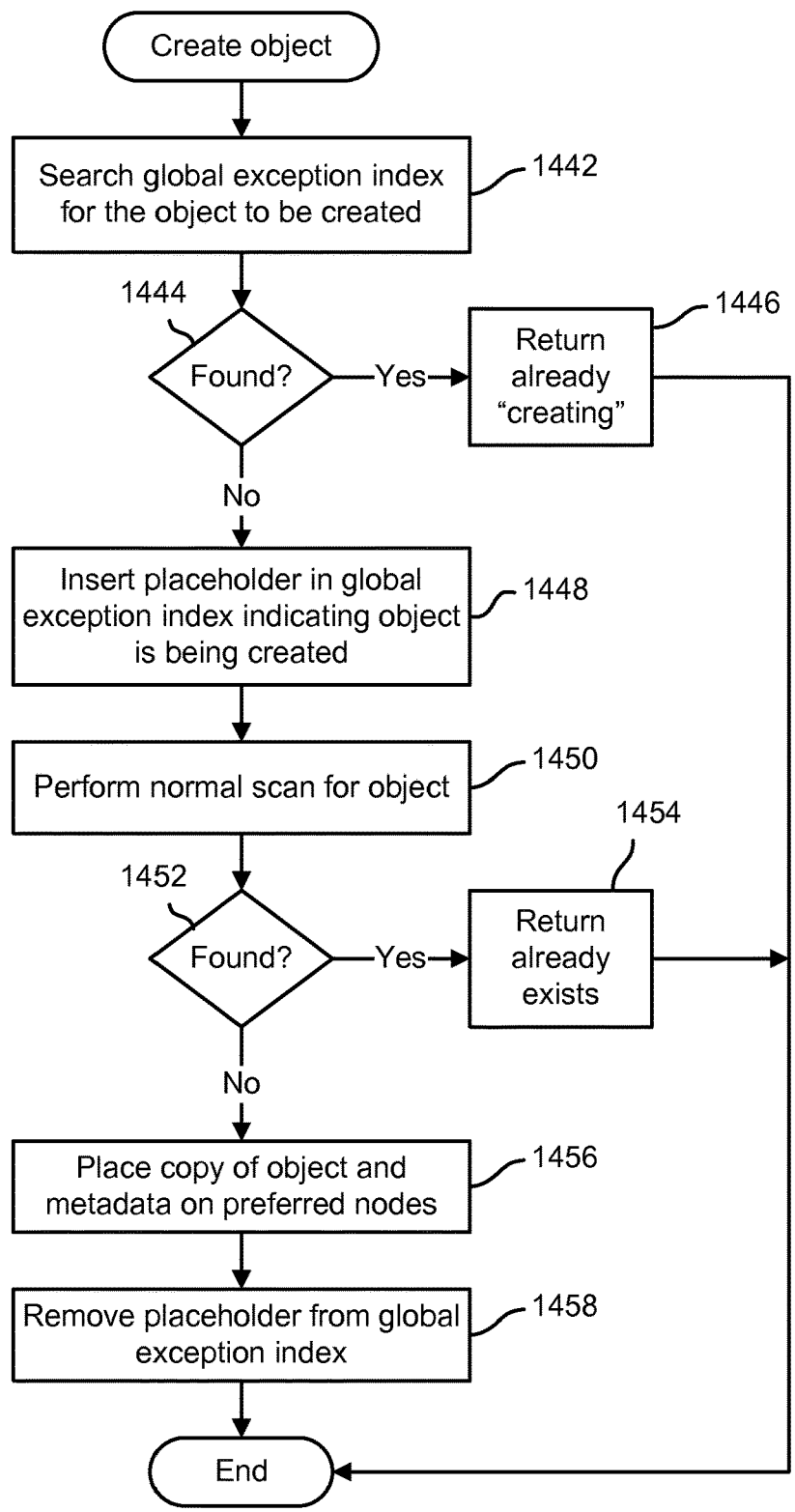
FIG. 14B is a flow diagram illustrating an embodiment of a process for creating an object in a distributed content storage system.

FIG. 14B is a flow diagram illustrating an embodiment of a process for creating an object in a distributed content storage system. When creating a new object and relying on the atomic insert properties of the global exception index, the creating node first searches the global exception index for the object to be created (1442). In some embodiments, the node may actually search for the object first using the preference list and then only fall back to searching the global exception index after it has confirmed that the object is not stored in a preferred location. In the object is found in the global exception index (1444), a result indicating the object already exists or is in the process of being created, as applicable, is returned (1446). If the object is not found in the global exception index (1444), a placeholder is inserted into the global exception index indicating that this object is currently being created (1448). After the placeholder entry is in the global exception index, a normal scan can be performed for the object according to the preference list and exception policy defined above (1450). If the object is found within the constraints of the exception policy (1452), a result indicating the object already exists is returned (1454). If the object is not found within the constraints of the exception policy (1452), then the creating node may place copies of metadata and object contents on a set of preferred nodes (1456).

After metadata and object contents are placed, the global exception index placeholder may be removed by the creating node (1458). In some embodiments, the placeholder may be removed as part of the normal background process of migrating objects in the global exception index and removing their exception entries when possible. Placeholder entries in the exception index may be marked with a time and/or originating node so that they may expire later due to timeout or node failure.

Using these methods, when a search is performed for an object using the preference list and the exception policy, a file can be classified as existing, not existing, creating, or deleting. If a file exists, valid current metadata and contents are found. If a file does not exist, no metadata or exception entry is found. If a file is creating, a placeholder entry is found in the global exception index indicating the file is being created. If a file is deleting, a metadata entry is found marked as deleted and without corresponding content.

In some embodiments, a large file or other object, such as a database, is partitioned into separately storable objects of a more manageable size. Each of the partitions is stored redundantly, as described herein, in a distributed content storage system. In various embodiments, partition boundaries may be formed based on ranges of keys in a database table, or based on ranges of columns in a column-oriented database, or by other means including a combination of the above so as to divide the data in the database into partitions. The nodes on which a partition is stored and/or from which access is attempted are selected based on features of the partition.

Figure 15:
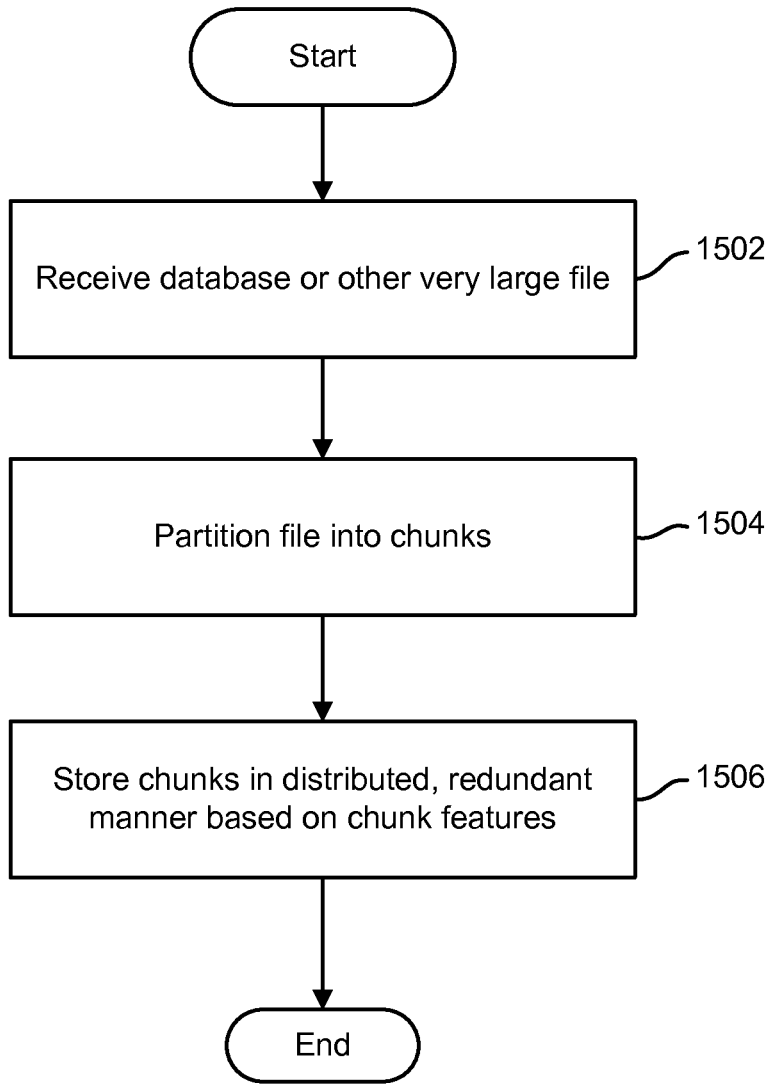
FIG. 15 is a flow diagram illustrating an embodiment of a process for storing a database or other large file.

FIG. 15 is a flow diagram illustrating an embodiment of a process for storing a database or other large file. The object or other large file is received (1502). The file is partitioned into chunks of a more manageable size (1504). In various embodiments, the partition size is pre-configured, configurable, and/or determined dynamically based on file features or other characteristics and/or content system conditions. Each partition is stored on the nodes selected based on that partition's features (1506). In some embodiments, partitions of a database table are named such that the table name, any assigned table owner that may be configured, and portions of the primary key or hashes thereof are each represented as unique features. Such a scheme allows subsets of a table to be stored in locations that access the records in that subset most frequently.

Figure 16:
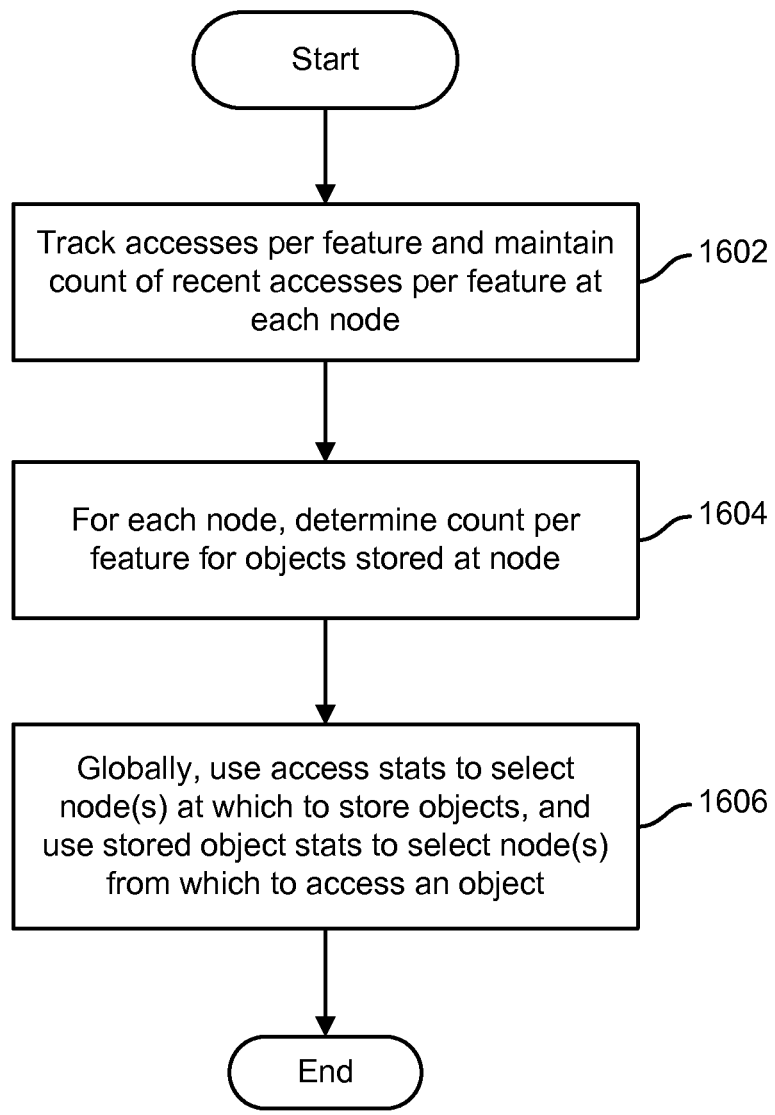
FIG. 16 is a flow diagram illustrating an embodiment of a process for accessing and storing objects.

FIG. 16 is a flow diagram illustrating an embodiment of a process for accessing and storing objects. In the example shown, at each node access counts per feature are kept (1602). For example, if an object having features 2, 3, and 5 is accessed, respective counts for each of the three features are incremented. In various embodiments, the counts are decayed over time to give greater weight to more recent accesses. In various embodiments, at any node at which a rapid change in access activity is detected with respect to one or more features, the rate of change is damped, for example by reducing the raw access count and/or adjusting probabilities determined based thereon. At each node, a count per feature for objects stored on the node is determined (1604). Globally, the accessed and stored object counts are aggregated and used to generate and distribute an access probability matrix and a stored object probability matrix (1606). A variety of approaches can be used to providing damping in the access and storage matrices. Damping is desirable because otherwise too many objects may no longer be in their optimal location after an access pattern change. In one embodiment, the matrices are damped by a low-pass filter, such as an infinite impulse response filter, before being distributed to the nodes. In other embodiments, the number of objects that will be relocated with a given new profile can be estimated by randomly sampling a portion of the object population and statistically determining the number of objects likely to be moved. In one embodiment, this is used in conjunction with damping or a global optimization algorithm to optimize the tradeoff between convergence towards the actual access profile and the number of objects moved. As a result, the rate at which objects are moved between nodes and the rate that objects are added to a global exception list can be controlled, while the access and storage probabilities that the system uses will approach the actual probabilities over time. The access probability matrix indicates for each node, and with respect to each node for each feature in a set of features, a likelihood that an object having that feature would be accessed at the node. The stored object probability matrix indicates for each node, and with respect to each node for each feature in a set of features, a likelihood that an object having that feature is stored at the node. In some embodiments, the access probability matrix is used to select a node at which to store an object, and the stored object probability matrix is used to select a node from which to access an object.

In some embodiments, an appliance having one or more slots each capable of receiving a removable disk drive or other storage device is provided. Disk or other drives may be inserted in the slots. Each is configured with data usable to integrate the drive as a node in a cluster with which the appliance is associated.

Figure 17:
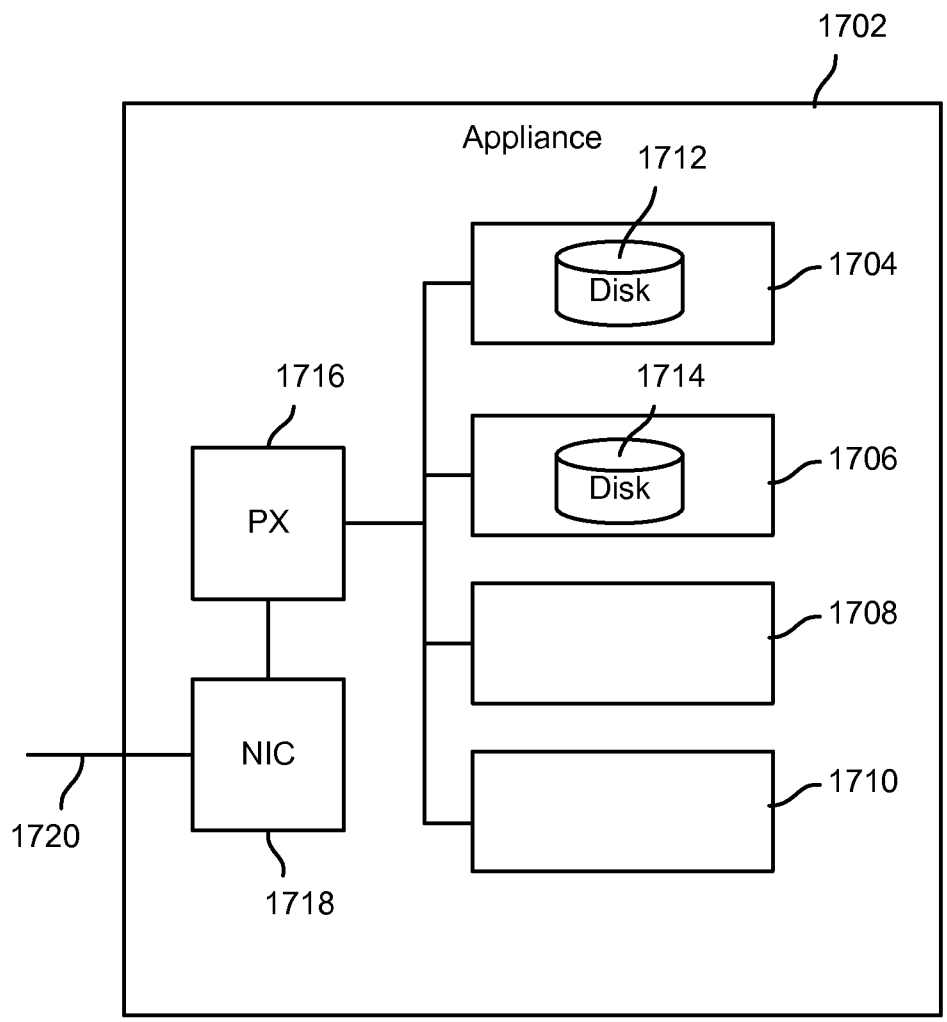
FIG. 17 is a block diagram illustrating an embodiment of a storage appliance.

FIG. 17 is a block diagram illustrating an embodiment of a storage appliance. In the example shown, appliance 1702 includes a plurality of slots 1704, 1706, 1708, and 1710.

Each slot is capable of receiving a hot swappable disk drive, such as disk 1712 and disk 1714. Each disk is preconfigured with data, e.g., a configuration file, that is read by processor 1716 upon the drive being inserted in one of the slots 1704, 1706, 1708, and 1710. The processor 1716 communicates via a network interface card or other interface 1718 and a network connection 1720 with other nodes in the cluster to inform them that the newly inserted disk has been added. In some embodiments each disk comprises a node. In some embodiments, the appliance 1702 comprises a node configured to use disks comprising the storage location to store content objects.

Figure 18:
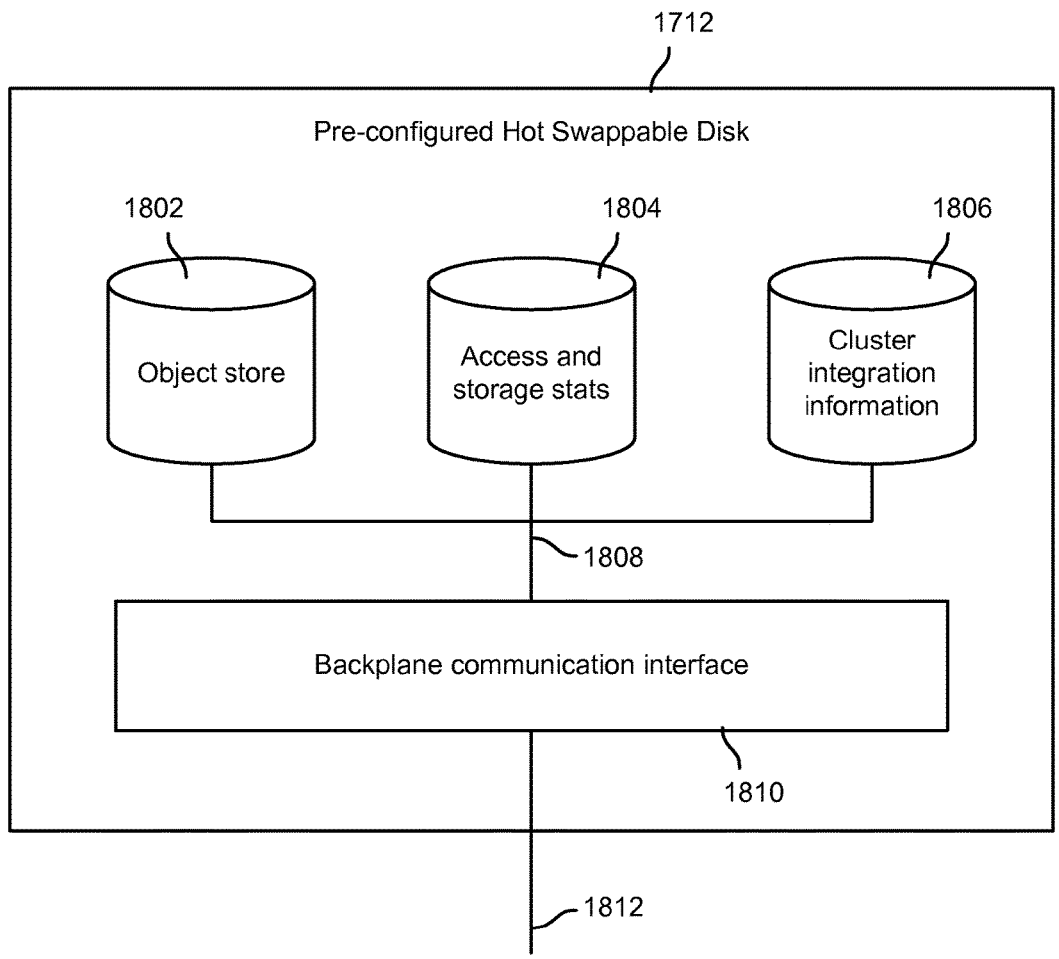
FIG. 18 is a block diagram illustrating an embodiment of a storage disk.

FIG. 18 is a block diagram illustrating an embodiment of a storage disk. In the example shown, pre-configured hot swappable disk 1712 includes an object store 1802 configured to store content objects, an access and stored object statistic store 1804 configured to store accessed object and stored object per feature counts and access and/or stored object probability matrices, and a configuration file or other cluster integration information store 1806 usable to integrate the disk, e.g., as a node, in a cluster identified in data stored in the cluster integration information store 1806. The data stores 1802, 1804, and 1806 are connected via an internal bus 1808 and a backplane communication interface 1810 to an appliance backplane 1812, by which the disk 1712 is connected to other disks and processor 1716 in appliance 1702. All objects of the various types, whether content or statistics or cluster integration information, may be stored on the disk within a single file system. In another embodiment, the statistics and/or metadata may be stored on a different storage device or node than the content, or resident within system memory.

While various embodiments are described above in some detail, other approaches are also possible. Simplifications can be used for smaller populations of nodes that do not require the full solution described above. Alternatively, other methods can be used instead as an augmentation or replacement for portions of the system, including multivariate analysis and convolution kernels.

In another embodiment, a node selecting storage locations may initiate storage and/or access requests to external storage, such as a Network Attached Storage filer or a Storage Area Network based on access and/or storage statistics. Alternatively, the node may direct external object requests to the appropriate device based on determined probabilities. In various embodiments, these disclosed statistical methods and selection policies are combined with existing storage infrastructure to provide distributed content storage and retrieval.

For small node populations, it may be simpler and more efficient to not store an exception index. When retrieving an object, the storage frequency matrices described above are consulted, and using Bayes' rule the probability of each possible storage location is determined. The system then requests the object from possible storage locations. In one embodiment, the request attempts to possible storage locations are made in the order of their respective probabilities. The search may terminate when the object is found or sufficient nodes have been consulted to determine that the object does not exist. For instance, if the object requires three replicas and all but two potential locations have been examined, the system can return that the object does not exist.

Multivariate analysis can allow dimensional compression when predictive value of features or locations overlap. Two useful multivariate analysis techniques are principal component analysis or correspondence analysis. It can also help to refine the previously described system by identifying features or locations that may be collapsed without losing significant predictive value. The aggregate access and storage matrices can be passed directly through a multivariate analysis technique. If the output is used for refinement, the most similar features and locations can be identified as having the closest principal coordinates in the resulting space. If the output is used purely for object placement and search, each potential storage node must be represented by its own point in the same space as the principal coordinates of the object features. An object then corresponds to a point found by combining the points of its features such as through a weighted mean mechanism using p-values for each feature as the weight. The preference list of storage nodes is the list of storage nodes sorted in ascending order by distance from the object's point. Drift in the statistical input and thus the resulting principal coordinates of features is constrained to reduce the rate of object relocation. Storage nodes can also move slowly in the principal coordinate space to improve the preference list selection. Nodes move slightly during each recalculation of statistics in a way that tends to move nodes away from each other while moving them closer to the nearest features and features with the greatest mass. In this way the node locations will stochastically approach the result of a k-means clustering algorithm on the principal coordinate space, where k is the number of storage nodes available.

In most cases, to fully represent the preferences associated with n locations requires a space of n−1 dimensions. However, to the extent location preferences are not independent, dimensional compression can be achieved (allowing the information to be stored in fewer dimensions). Such compressed multidimensional spaces can be perturbed or convoluted to convert from preference or access rate metric space to cost metric space. While such methods may be more expressive about changes in network topology, such as when a location is split or an additional location is added, the significant increase in complexity does not justify their use in practice.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system of storing data, comprising:
a processor configured to:
gather, from each storage location of a plurality of storage locations within a distributed content storage system, a corresponding plurality of access count data corresponding to respective ones of a plurality of features wherein an access count data of the plurality of access count data corresponding to a respective feature of the plurality of features represents at least one of a quantity of objects stored at that storage location that have that feature and a quantity of objects accessed at that storage location that have that feature;
determine probability data based at least in part on the corresponding plurality of access count data corresponding to respective ones of the plurality of features gathered from each storage location, wherein the probability data comprises data that indicates with respect to each storage location for each feature, a probability that an object having that feature will be accessed from that storage location;

determine a set of features associated with a content object associated with an operation, wherein the set of features comprises a set of properties associated with the content object;

use at least the probability data to determine for each storage location of at least a subset of the plurality of storage locations, a corresponding expected likelihood that an object having a feature of the set of features associated with the content object is associated with that storage location; and select a storage location to perform the operation with respect to the content object, from the plurality of storage locations, based at least in part on an expected likelihood that the object having the feature is associated with the selected storage location; and a memory coupled to the processor and configured to provide the processor with instructions.

2. The system of claim 1, wherein the operation comprises storing the content object within the selected storage location.

3. The system of claim 1, wherein the operation comprises attempting to access the content object at the selected storage location.

4. The system of claim 1, wherein the operation comprises attempting to retrieve the content object from the selected storage location, without first determining based on an index or other data that the content object is in fact stored within the selected storage location.

5. The system of claim 1, wherein the expected likelihood that the object having the feature is associated with the selected storage location comprises at least a relative degree to which the selected storage location is associated with the feature as compared to another storage location that is not selected.

6. The system of claim 1, wherein the selected storage location comprises a geographic location.

7. The system of claim 1, wherein the selected storage location comprises a node.

8. The system of claim 1, wherein the selected storage location comprises a disk.

9. The system of claim 1, wherein the set of features comprises one or more statements which are true with respect to the content object.

10. The system of claim 1, wherein the probability data comprises an access probability matrix.

11. The system of claim 1, wherein the probability data comprises a probability matrix indicating for each of a plurality of storage devices within the distributed content storage system, and with respect to each storage device for each feature, a frequency with which the object having the feature is accessed from the storage location that contained that storage device.

12. The system of claim 1, wherein the set of features comprises one or more features and further comprising using the probability data to determine for each feature in the set a degree to which each of a plurality of candidate storage locations is associated statistically with that feature, wherein the plurality of storage locations comprises the plurality of candidate storage locations.

13. The system of claim 12, wherein the processor is further configured to determine with respect to each candidate storage location an expected cost associated with selecting a node contained within that candidate storage location to perform the operation.

14. The system of claim 13, wherein the selected storage location is selected based at least in part on the respective expected costs determined to be associated with selecting the respective candidate storage locations to perform the operation.

15. The system of claim 1, wherein the processor is further configured to apply an administrative policy to determine that the selected storage location is one or both of eligible and required to be selected in light of the expected likelihood that the object having the feature is associated with the selected storage location and a determined cost associated with selecting the selected storage location.

16. The system of claim 1, wherein the probability data indicates an expected frequency that the object having the feature would be accessed from the selected storage location and the operation that the selected storage location is selected to perform is to store the content object.

17. The system of claim 1, wherein the probability data indicates a probability that the object having the feature is stored at the selected storage location and the operation that the selected storage location is selected to perform is to access the content object.

18. The system of claim 1, wherein to determine the set of features associated with the content object comprises to:
evaluate an identifier associated with the content object to determine one or more characteristics; and
obtain the set of features from the one or more characteristics associated with the identifier associated with the content object.

19. A method of storing data, comprising:
gathering, from each storage location of a plurality of storage locations within a distributed content storage system, a corresponding plurality of access count data corresponding to respective ones of a plurality of features, wherein an access count data of the plurality of access count data corresponding to a respective feature of the plurality of features represents at least one of a quantity of objects stored at that storage location that have that feature and a quantity of objects accessed at that storage location that have that feature;
determining probability data based at least in part on the corresponding plurality of access count data corresponding to respective ones of the plurality of features gathered from each storage location, wherein the probability data comprises data that indicates with respect to each storage location for each feature, a probability that an object having that feature will be accessed from that storage location;
determining a set of features associated with a content object associated with an operation, wherein the set of features comprises a set of properties associated with the content object;
using at least the probability data to determine for each storage location of at least a subset of the plurality of storage locations, a corresponding expected likelihood that an object having a feature of the set of features associated with the content object is associated with that storage location; and
selecting a storage location to perform the operation with respect to the content object, from the plurality of storage locations, based at least in part on an expected likelihood that the object having the feature is associated with the selected storage location.

20. The method of claim 19, wherein the operation comprises attempting to retrieve the content object from the selected storage location, without first determining based on an index or other data that the content object is in fact stored within the selected storage location.

21. The method of claim 19, wherein the set of features comprises one or more features and further comprising using the probability data to determine for each feature in the set a degree to which each of a plurality of candidate storage locations is associated statistically with that feature, wherein the plurality of storage locations comprises the plurality of candidate storage locations.

22. The method of claim 21, further comprising determining with respect to each candidate storage location an expected cost associated with selecting a node contained within that candidate storage location to perform the operation.

23. The method of claim 22, wherein the selected storage location is selected based at least in part on the respective expected costs determined to be associated with selecting the respective candidate storage locations to perform the operation.

24. The method of claim 19, further comprising applying an administrative policy to determine that the selected storage location is one or both of eligible and required to be selected in light of the expected likelihood that the object having the feature is associated with the selected storage location and a determined cost associated with selecting the selected storage location.

25. A computer program product for storing data, the computer program product being embodied in a non-transitory computer readable storage medium and comprising computer instructions for:

gathering, from each storage location of a plurality of storage locations within a distributed content storage system, a corresponding plurality of access count data corresponding to respective ones of a plurality of features, wherein an access count data of the plurality of access count data corresponding to a respective feature of the plurality of features represents at least one of a quantity of objects stored at that storage location that have that feature and a quantity of objects accessed at that storage location that have that feature;

determining probability data based at least in part on the corresponding plurality of access count data corresponding to respective ones of the plurality of features gathered from each storage location, wherein the probability data comprises data that indicates with respect to each storage location for each feature, a probability that an object having that feature will be accessed from that storage location;

determining a set of features associated with a content object associated with an operation, wherein the set of features comprises a set of properties associated with the content object;

using at least the probability data to determine for each storage location of at least a subset of the plurality of storage locations, a corresponding expected likelihood that an object having a feature of the set of features associated with the content object is associated with that storage location; and selecting a storage location to perform the operation with respect to the content object, from the plurality of storage locations, based at least in part on an expected likelihood that the object having the feature is associated with the selected storage location.

\* \* \* \* \*